(12) United States Patent
Kaldewey et al.

(10) Patent No.: US 11,604,654 B2
(45) Date of Patent: Mar. 14, 2023

(54) EFFECTIVE AND SCALABLE BUILDING AND PROBING OF HASH TABLES USING MULTIPLE GPUS

(71) Applicant: NVIDIA Corporation, San Jose, CA (US)

(72) Inventors: Tim Kaldewey, Bala Cynwyd, PA (US); Jiri Johannes Kraus, North Rhine-Westphalia (DE); Nikolay Sakharnykh, Chicago, IL (US)

(73) Assignee: NVIDIA Corporation, Santa Clara, CA (US)

( * ) Notice: Subject to any disclaimer, the term of this patent is extended or adjusted under 35 U.S.C. 154(b) by 263 days.

(21) Appl. No.: 16/656,375

(22) Filed: Oct. 17, 2019

(65) Prior Publication Data

US 2020/0125368 A1 Apr. 23, 2020

Related U.S. Application Data

(60) Provisional application No. 62/749,511, filed on Oct. 23, 2018.

(51) Int. Cl.
*G06F 9/38* (2018.01)
*G06F 9/54* (2006.01)
(Continued)

(52) U.S. Cl.
CPC .......... *G06F 9/3877* (2013.01); *G06F 9/5061* (2013.01); *G06F 9/544* (2013.01);
(Continued)

(58) Field of Classification Search
CPC .......................... G06F 9/3877; G06F 16/2456
(Continued)

(56) References Cited

U.S. PATENT DOCUMENTS 8,392,463 B2 * 3/2013 Gautam ............ G06F 16/24532
709/201
9,098,323 B2 * 8/2015 Mitra ................... G06F 9/45533
(Continued)

OTHER PUBLICATIONS

International Search Report and Written Opinion in International Patent Application No. PCT/US2019/056801 dated Mar. 27, 2020.
(Continued)

*Primary Examiner* — Sheree N Brown
(74) *Attorney, Agent, or Firm* — Taylor English Duma L.L.P.

(57) ABSTRACT

Described approaches provide for effectively and scalably using multiple GPUs to build and probe hash tables and materialize results of probes. Random memory accesses by the GPUs to build and/or probe a hash table may be distributed across GPUs and executed concurrently using global location identifiers. A global location identifier may be computed from data of an entry and identify a global location for an insertion and/or probe using the entry. The global location identifier may be used by a GPU to determine whether to perform an insertion or probe using an entry and/or where the insertion or probe is to be performed. To coordinate GPUs in materializing results of probing a hash table a global offset to the global output buffer may be maintained in memory accessible to each of the GPUs or the GPUs may compute global offsets using an exclusive sum of the local output buffer sizes.

22 Claims, 13 Drawing Sheets

(51) Int. Cl.
*H04L 9/06* (2006.01)
*G06F 16/2455* (2019.01)
*G06F 9/50* (2006.01)
*G06F 16/28* (2019.01)

(52) U.S. Cl.
CPC ........ *G06F 16/2456* (2019.01); *G06F 16/283* (2019.01); *H04L 9/0643* (2013.01)

(58) Field of Classification Search
USPC .......................................................... 707/714
See application file for complete search history.

(56) References Cited

U.S. PATENT DOCUMENTS

| | | | | |
|---|---|---|---|---|
| 9,600,852 | B2* | 3/2017 | Demouth | G06F 16/2255 |
| 9,971,808 | B2* | 5/2018 | Kamath | G06F 16/2455 |
| 10,181,172 | B1* | 1/2019 | Wilt | G06T 1/20 |
| 10,181,173 | B1* | 1/2019 | Wilt | G06T 1/60 |
| 10,331,669 | B2* | 6/2019 | Kamath | G06F 16/221 |
| 10,423,463 | B1* | 9/2019 | Wilt | G06F 9/5044 |
| 11,030,714 | B2* | 6/2021 | Das | G06F 16/00 |
| 11,269,884 | B2* | 3/2022 | Miller | G06F 16/2455 |
| 2011/0264626 | A1* | 10/2011 | Gautam | G06F 16/24532 |
| | | | | 707/E17.014 |
| 2013/0141444 | A1* | 6/2013 | Gautam | G06T 3/00 |
| | | | | 345/505 |
| 2014/0122509 | A1* | 5/2014 | Pantaleoni | G06F 16/43 |
| | | | | 707/754 |
| 2014/0257769 | A1* | 9/2014 | Sakharnykh | G16C 10/00 |
| | | | | 703/2 |
| 2014/0330801 | A1* | 11/2014 | Kaldewey | G06F 16/2255 |
| | | | | 707/698 |
| 2014/0333635 | A1* | 11/2014 | Demouth | G06F 9/3885 |
| | | | | 345/505 |
| 2014/0337313 | A1* | 11/2014 | Becerra | G06F 16/24553 |
| | | | | 707/713 |
| 2016/0378751 | A1* | 12/2016 | Kamath | G06F 16/2455 |
| | | | | 707/747 |
| 2016/0378754 | A1* | 12/2016 | Kamath | G06F 16/2455 |
| | | | | 707/747 |
| 2019/0236752 | A1* | 8/2019 | Das | G06F 16/00 |
| 2019/0378754 | A1* | 12/2019 | Lakshmanan | H01L 21/76856 |
| 2021/0133917 | A1* | 5/2021 | Tu | G06T 1/20 |

OTHER PUBLICATIONS

Kaldeway, Tim et al., "GPU Acceleration for OLAP", presented at GPU Technology Conference, S8289—How to Get the Most out of GPU Accelerated Database Operators, Mar. 26-29, 2018.

Karnagel, Tomas, Tal Ben-Nun, Matthias Werner, Dirk Habich, and Wolfgang Lehner. "Big data causing big (TLB) problems: taming random memory accesses on the GPU." In Proceedings of the 13th International Workshop on Data Management on New Hardware, p. 6. ACM, 2017.

Kaldewey, Tim, Guy Lohman, Rene Mueller, and Peter Volk. "GPU join processing revisited." In Proceedings of the Eighth International Workshop on Data Management on New Hardware, pp. 55-62. ACM, 2012.

International Preliminary Report on Patentability received for PCT Application No. PCT/US2019/056801, dated May 6, 2021, 8 pages.

* cited by examiner

EFFECTIVE AND SCALABLE BUILDING AND PROBING OF HASH TABLES USING MULTIPLE GPUS

CROSS-REFERENCE TO RELATED APPLICATIONS

This application claims the benefit of U.S. Provisional Application No. 62/749,511, filed on Oct. 23, 2018, which is hereby incorporated by reference in its entirety.

BACKGROUND

Data may be stored in relational databases over multiple tables. The tables reference each other according to a database schema, such as a star schema. A query—such as an SQL query—may be submitted for processing against the tables in order to return requested data. This processing may involve any number of operations, which may implement relational algebra, examples of which include joins, group by, order by, etc. In many systems, a performance bottleneck in processing a query is in performing a join of relations. One such example is in OnLine Analytical Processing (OLAP), which allows users to analyze multidimensional data interactively from multiple perspectives. It has been found that joins of large relations can be significantly accelerated in systems using a Graphics Processing Unit (GPU).

In a hash-based join algorithm, a GPU may use a build table (which may also be referred to as a "dimension table") to create a hash table in a build phase, then probe the hash table with entries from a probe table (which may also be referred to as a "fact table" and is usually larger than the build table) in a probe phase. A build phase may involve reading a row from the build table, hashing the row on its join key(s) to compute a hash value, and inserting its payload (and optionally its key(s) or a pointer to the key(s)) into the hash table at a location that corresponds to the hash value. During the probe phase, the GPU may read a row from the probe table, hash the row on its join key(s) to compute a hash value, and use the hash value of the row to probe for a matching row in the hash table. However, while using the GPU may accelerate this process, a single GPU may not always be sufficient to join input tables fast enough—or at all—due to the speed or the memory capacity of a single GPU. For example, a single GPU may not have sufficient memory to store a hash table for a join, or may perform the join slower than desired due to the number of random memory accesses used to build and/or probe the hash table.

SUMMARY

Embodiments of the present disclosure provide for the effective and scalable building and probing of hash tables using multiple GPUs. In particular, the present disclosure provides approaches for effectively and scalably using multiple GPUs to build hash tables, probe hash tables, and materialize results of probing hash tables, which may be used to implement multi-GPU joins.

While conventional approaches provide for implementing joins of tables using a single GPU, the present disclosure describes solutions for leveraging multiple GPUs to implement joins of tables. Various approaches are described for building a hash table, probing a hash table, and materializing results of a probe, some of which may be used in combination or with other approaches. Disclosed approaches may leverage the memory of multiple GPUs in processing a join operation to increase the effective memory capacity available to the system. Disclosed approaches may also leverage the processing capabilities of multiple GPUs executing in parallel when processing a join operation to reduce the runtime of a join relative to conventional approaches.

In various examples, the random memory accesses required to build and/or probe a hash table may be executed in parallel on multiple GPUs using global location identifiers (IDs). A global location ID may be computed from data of an entry (from the one or more keys of the entry) and identify a global location (e.g., in a hash table) associated with the entry. In building the hash table, each GPU may be allocated one or more portions (e.g., partitions) of the hash table, and the GPUs may compute the global location IDs from entries in the build table to determine, for an entry, whether to perform an insertion using the entry and/or where the insertion is to be performed. In probing the hash table, the GPUs may compute the global location IDs from entries in the probe table to determine, for an entry, whether to perform a probe using the entry and/or where the probe is to be performed.

The disclosure further describes approaches for coordinating GPUs in materializing results in the probe phase of a hash join operation, which may allow for parallel writes to a global output buffer. In some approaches, a global offset to the global output buffer is maintained in memory accessible to each of the GPUs to indicate where each GPU should write a portion of the results. When a GPU is to write a portion of the results (e.g., directly without local buffering), the global offset may be incremented to account for the size of the portion of the results in the global offset buffer. In further approaches, the GPUs may write portions of the results to local or initial output buffers. To materialize the portions of the results to the global output buffer, the GPUs may compute an exclusive sum of the local or initial output buffer sizes. The exclusive sum may provide for each local or initial output buffer, a global offset to the global output buffer to indicate where the portion of results from the local or initial output buffer should be written to in the global output buffer.

BRIEF DESCRIPTION OF THE DRAWINGS

The present systems and methods for effective and scalable building and probing of hash tables using multiple GPUs is described in detail below with reference to the attached drawing figures, wherein.

DETAILED DESCRIPTION

Figure 1:
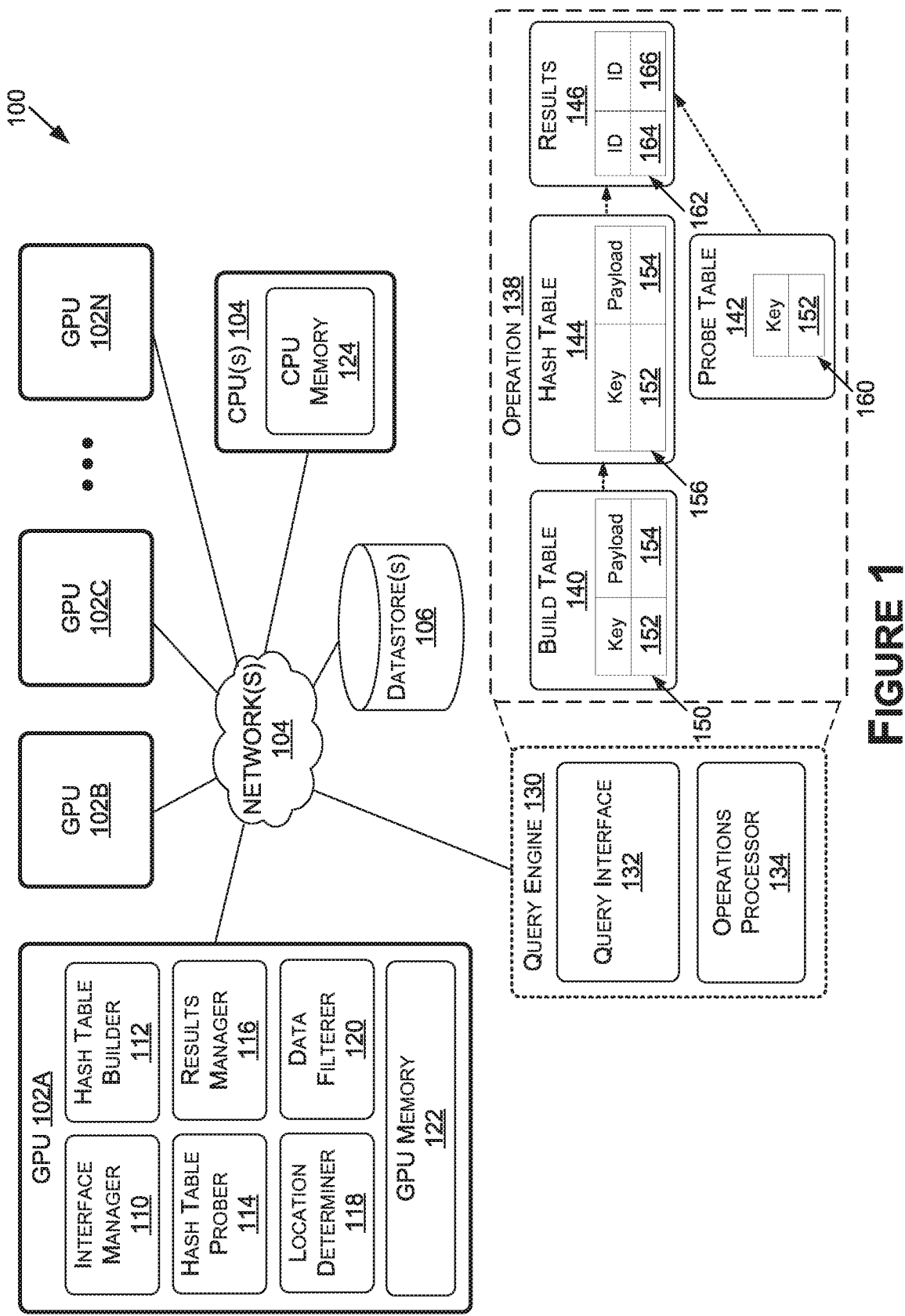
FIG. 1 is an example system diagram of a multi-GPU distributed processing system, in accordance with some embodiments of the present disclosure.

The present disclosure provides for the effective and scalable building and probing of hash tables using multiple GPUs. In various respects, the present disclosure provides approaches for effectively and scalably using multiple GPUs to build hash tables, probe hash tables, and materialize results of probing hash tables, which may be used to implement multi-GPU joins or other operations involving the building and/or probing of hash tables.

In various examples, the random memory accesses required to build and/or probe a hash table may be executed in parallel on multiple GPUs using global location identifiers (IDs). A global location ID may be computed from data of an entry (from the one or more keys of the entry) and identify a global location (e.g., in a hash table and/or at a particular GPU) associated with the entry. For example, a hash value may be computed from the key(s) of each entry, and used to derive the global location ID for the entry. Examples of the global location ID include a global hash value index of a hash table, a global bucket ID of the hash table, a GPU ID, and/or a hash table partition ID. In building the hash table, each GPU may be allocated one or more portions (e.g., partitions) of the hash table, and the GPUs may compute the global location IDs from entries in the build table to determine, for an entry, whether to perform an insertion using the entry and/or where the insertion is to be performed.

In some approaches—to build a hash table in a distributed manner using multiple GPUs—each GPU may be assigned or allocated a partition(s) of the hash table and the build table for an operation may be distributed across the GPUs (e.g., with one or more build table partitions per GPU). Each hash table partition may cover a different range of addresses (contiguous values) in the hash table (sets of one or more buckets of values using open addressing). Each GPU may read data from entries of the GPU's build table portion and determine, from the data of each entry, the global location ID for that entry. If the GPU determines, using the global location ID, the corresponding location for the insertion is within the GPU's hash table partition, the GPU may insert the payload (and keys or entry index) therein. Otherwise, the payload may not be inserted into the GPU's hash table partition, but may be inserted at the GPU associated with the location for the insertion. Thus, the number of random memory accesses to GPU memory for insertions of entries into the hash table may be distributed across the GPUs and parallelized.

After a GPU processes at least some of the GPU's build table portion (e.g., a full partition), it may pass build table data representative of at least one non-inserted entry of the processed portion of the build table to another GPU. The processing and passing of build table data may continue until the hash table is fully built. Double buffering may be used to overlap the processing and passing of the build table data. The processed build table data exchanged between GPUs may include, for each entry, data sufficient to perform an insertion of the entry, such as a payload and a corresponding key(s) and/or a hash value. In examples where GPUs initially include multiple build table portions, when a GPU receives build table data from another GPU, it may process the received build table data along with an initial build table portion.

In some examples, the processed build table data is passed using an exchange or routing algorithm, such as a ring exchange. In the ring exchange, GPUs may be logically arranged in a ring so that each GPU has a left and a right neighbor. When passing build table data to another GPU, each GPU may pass the build table data to a neighbor in a same direction, regardless of whether the neighbor corresponds to a location for an insertion of an entry captured by the build table data. This approach may be used where all-to-all GPU communication is unavailable or undesirable.

In further examples (e.g., as an alternative to a ring exchange), a GPU may provide build table data for an entry(s) directly to a particular GPU based on determining (using the global location ID) that the other GPU corresponds to the location for the insertion of the entry into the hash table. In some examples, the other GPU may use the received build table data to locally perform the insertion. In further examples, the GPU may use the build table data to remotely insert the entry into the other GPU's hash table partition, such as by using a system wide atomic operation to the peer GPU.

The disclosure further provides, in part, approaches for distributed probing of a hash table. In replicated hash table approaches, each GPU has a local copy of the hash table that may be used to parallelize operations of a probe phase. A replicated hash table approach may use a build phase to form partitions of the hash table that are distributed across the GPUs, which are then merged to form the local copies. In partitioned hash table approaches, each GPU has a respective partition of the hash table that is used to parallelize operations of a probe phase, thus, the merging of hash table partitions may not be required.

The replicated hash table approach may be more desirable to use in join operations as the size of the probe table becomes larger compared to the build table. For example, while the build phase of a replicated hash table approach may take longer than partitioned hash table approaches due to merging hash table partitions across the GPUs to create the local copies, the probe phase may be faster, as each GPU may locally probe any portion of the hash table, reducing inter-GPU traffic. The partitioned hash table approach may be used to reduce the memory requirements for storing the hash table, as each GPU does not need to store a local copy of the full hash table. Hybrid approaches—in which one or more GPUs include a full copy and one or more other GPUs include one or more hash table partitions—may also be used in accordance with the present disclosure.

For distributed probing using partitioned hash table approaches, each GPU may be provided a portion of the probe table, and the GPU may probe the hash table partition(s) using entries from the local probe table portion. In probing the hash table, the GPUs may compute the global location IDs from entries in the probe table to determine, for an entry, whether to perform a probe using the entry and/or where the probe is to be performed (e.g., similar to a build phase). Thus, the number of random memory accesses to GPU memory for probes of the hash table using the entries may be distributed across the GPUs and parallelized.

After a GPU processes at least some of the GPU's probe table portion (e.g., a full partition), it may pass probe table data representative of at least one non-probed entry of the processed portion of the probe table to another GPU. The processing and passing of probe table data may continue until the hash table has been probed for all probe table entries, this may be when a probe table partition has visited all the GPUs and/or there are no remaining entries to probe. Double buffering may be used to overlap the processing and passing of the probe table data. The processed probe table data exchanged between GPUs may include, for each entry, data sufficient to perform a probe the hash table for the entry, such as a corresponding key(s), a payload, and/or a hash value.

In some examples, the processed probe table data is passed using an exchange or routing algorithm, such as a ring exchange. In further examples (e.g., as an alternative to a ring exchange), a GPU may provide probe table data for an entry(s) directly to a particular GPU based on determining (using the global location ID) that the other GPU corresponds to the location for the probe of the hash table for the entry. In some examples, the other GPU may use the received probe table data to locally perform the probe. In further examples, the GPU may use the probe table data to remotely probe the other GPU's hash table partition.

In further examples, in addition to or instead of a GPU providing the probe table data to another GPU, it may provide hash table data corresponding to a hash table partition or portion. For example, the GPUs may exchange hash table data for probing and each GPU may use the same local probe table portion for probing until the probe table is fully processed (e.g., each hash table data for a hash table partition has visited each GPU and/or results have been generated for each probe table entry).

In further respects, the probe table may be rearranged to form the probe table portions provided to the GPUs based on the hash table indices of the entries. For example, the probe table may be arranged such that each GPU receives entries from the probe table that correspond to the location for probing using those entries. For example, the probe table portions may be configured such that the entries of each probe table portion includes keys that hash into the range of the hash table partition on a corresponding GPU. In some examples, the entries may be assigned to the probe table portions using corresponding global location IDs.

The disclosure further describes approaches for coordinating GPUs in materializing results of probing a hash table, which may allow for parallel writes to a global output buffer. In some approaches, a global offset to the global output buffer is maintained in memory accessible to each of the GPUs to indicate where each GPU should write a portion of the results. When a GPU is to write a portion of the results (e.g., directly without local buffering), the global offset may be incremented to account for the size of the portion of the results in the global offset buffer, possibly using atomic memory operations. In further approaches, the GPUs may write portions of the results to local or initial output buffers. To materialize the portions of the results to the global output buffer, the GPUs may compute an exclusive sum of the local or initial output buffer sizes. The exclusive sum may provide for each local or initial output buffer, a global offset to the global output buffer to indicate where the portion of results from the local or initial output buffer should be written to in the global output buffer.

With reference to FIG. 1, FIG. 1 is an example system diagram of a multi-GPU distributed processing system 100, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. By way of example, the multi-GPU distributed processing system 100 may be implemented on one or more instances of the computing device 1400 of FIG. 14.

The multi-GPU distributed processing system 100 (also referred to as "system 100") may include, among other components, a plurality of GPUs (e.g., two or more), such as a GPU 102A and a GPU 102B, through a GPU 102N (also referred to as "GPUs 102A-102N"), one or more CPUs, such as a CPU(s) 104, and one or more datastores, such as a datastore(s) 106.

Although illustrated in the GPU 102A, each of the GPUs 102A-102N may include, for example, a separate instance of an interface manager 110, a hash table builder 112, a hash table prober 114, a results manager 116, a location determiner 118, a data filterer 120, and a GPU memory 122.

The system 100 may be configured to execute any number of operations on data from tables stored in the datastore 106—such as an operation 138 involving a build table 140, a probe table 142, and a hash table 144—to produce one or more results 146. In some embodiments, the operation 138 may be executed by a query engine 130 as part of executing a query. The query engine 130 includes a query interface 132 and an operations processor 134. The functionality of the query interface 132 and/or the operations processor 134 may be implemented using one or more computing devices, such as the GPUs 102A-102N, the CPU(s) 104, and/or other devices.

As an overview, the query interface 132 may be configured to receive queries from users and/or software and the operations processor 134 may be configured to execute the queries. Processing a query may involve executing any number of operations, which may implement relational algebra, examples of which include joins, group by, order by, etc. The operation 138 is one such example of an operation, which may be a join operation. The GPUs 102A-102N may be used for multi-GPU distributed processing of one or more portions of the operation 138. For example, the distributed processing of the GPUs 102A-102N may be used to construct the hash table 144 from the build table 140, to probe the hash table 144 using the probe table 142, to materialize the results 146 of the operation 138, and/or to provide other distributed processing and storage capabilities.

An overview is provided for components of the GPU 102A, which may be similar for each of the GPUs 102A-102N. The interface manager 110 is configured to manage the receipt of data by the GPU 102A, as well as the transmission of data from the GPU 102A. The hash table builder 112 is configured to implement functionality used to build a hash table, such as the hash table 144 using the build table 140, which may involve insertions into the hash table using build table entries. The hash table prober 114 is configured to implement functionality used to probe a hash table, such as the hash table 144 using the probe table 142, which may involve probing the hash table using probe table entries. The results manager 116 is configured to implement functionality used to materialize results of operations, such as the results 146 of the operation 138. The location determiner 118 is configured to determine locations (e.g., using a global location ID) to facilitate the functionality of one or more of the hash table builder 112, the hash table prober 114, the results manager 116, and/or other components of the GPU 102A. The locations may correspond to partitions and/or buckets of the hash table 144 for inserting entries therein or probing of entries therein and/or GPUs that include the partitions and/or buckets of the hash table 144.

The datastore 106 may comprise computer-readable media and may be configured to store data (e.g., of relational tables) that the query engine 130 may execute the queries against. Although depicted as a single component, the datastore 106 may be embodied as one or more data stores and may be in the cloud and/or distributed in any suitable manner across one or more data stores for storage. The one or more data stores may, as various examples, be hosted externally to other components of the system 100 and/or at least partially within one or more other components of the system 100, such as the GPUs 102A-102N, the CPUs 104 and/or host computing systems or devices thereof.

In various examples, at least some of the data in the datastore 106 may be stored over multiple tables. The tables reference each other according to a database schema, such as a star schema. For example, the data may be stored in one or more relational databases of the datastore 106. To determine and retrieve information from the datastore 106, the system 100 may process the data using any number of operations—such as the operation 138—which may implement relational algebra, examples of which include joins, group by, order by, etc.

In some embodiments, the query engine 130 is used to implement operations according to an approach such as OnLine Analytical Processing (OLAP), which allows users or software to analyze multidimensional data interactively from multiple perspectives by submitting queries to the query interface 132. However, the query engine 130 may be used to implement any suitable data processing technology involving executing operations against data, such as join operations. For example, a query—such as an SQL query—may be submitted to the query interface 132 of the query engine 130 for processing against the data in order to return requested data.

The operation 138 may be an operation defined by a query, corresponding to, for example, a join of relations. In this regard the results 146 may refer to an output set of an operation (e.g., a join operation), which may be the output set of a query, or an intermediate set used to produce an output set of the query. However, the operation 138 and/or one or more portions thereof, such as building the hash table 144, probing the hash table 144, or materializing results of probing the hash table 144, may be practiced outside of the context of query execution (e.g., using an operations processor 134). In other words, aspects of the present disclosure need not be limited to particular operations and/or systems. Further these different portions of the operation 138 may be performed at any suitable time and by different systems (e.g., the system 100 need not perform all of these portions of the operation 138). Also in some examples, the hash table 144 may be built and may be probed in multiple different operations, such as using a different probe table for each operation.

The build table 140 may refer to a relation from which the hash table 144 is created. This could be, for example, one or multiple columns from a given table of the data in the datastore 106. The build table 140 may also be referred to as a dimension table. The probe table 142 may refer to a relation which is probed against the hash table 144 created from the build table 140. This could be, for example, one or multiple columns from a given table. The probe table 142 may also be referred to as a fact table, and is typically larger than the build table 140. The hash table 144 may correspond to a data structure created from the build table and may be used for fast random access by the GPUS 102A-102N to accelerate the operation 138. The hash table 144 may correspond to a hash function used to compute a hash index into an array of buckets or slots for a corresponding value. The hash index may also be referred to as a hash value. Due to imperfections in the hash function, collisions may occur where the hash function generates the same hash index for more than one entry. In various embodiments, the hash table 144 may be implemented using an addressing scheme, such as open addressing. In any example, collisions may be resolved using open addressing with linear probing. Open addressing may provide a method for handling the collisions. In open addressing, all elements may be stored in the hash table itself. A hash collision may be resolved by probing, or searching through alternate locations in the array (the probe sequence) until either the target entry is found, or an unused array entry slot is found, which may indicate that there is no such key in the hash table. In linear probing, the interval between probes may be fixed.

One or more portions of the build table 140, the probe table 142, and/or the hash table 144 may be stored in and/or distributed across the CPU memory 124 of the CPU(s) 104, the GPU memory 122 of the GPUs 102A-102N, and/or other storage locations. The distribution and locations of the data may vary for different embodiments. The CPU memory 124 of the CPU(s) 104, the GPU memory 122 of the GPUs 102A-102N, and/or other storage may comprise Random Access Memory (RAM). For example, the CPU memory 124 may refer to RAM attached to a CPU 104, which may also be referred to as system memory. Further, the GPU memory 122 may refer to RAM attached to a GPU, which may also be referred to as device memory. In various examples, each of the one or more CPUs 104 may correspond to one or more of a computing device 1400 of FIG. 14. Further, each computing device 1400 may host one or more of the GPUs 102A-102N. For example, one or more CPU 104 may correspond to the CPU(s) 1406 and one or more of the GPUs 102A-102N may correspond to the GPU(s) 1408.

When the operation 138 is executed using a hash-based join algorithm, the system 100 may use the build table 140 to create the hash table 144 in a build phase, then probe the hash table 144 with entries (e.g., rows) from the probe table 142 in a probe phase. The build phase may involve the system 100 reading an entry 150 (e.g., a row) from the build table 140, hashing the entry on its key(s) 152 (e.g., a join key) to compute a hash value, and inserting its payload 154 into an entry 156 of the hash table 144 at a location (e.g., row), having a hash index, that corresponds to the hash value. In addition to the payload 154, the key(s) 152 or a pointer used to locate the key(s) 152 may also be inserted into the entry 156 of the hash table 144. During the probe phase, the system 100 may read an entry 160 from the probe table 142, hash the entry 160 on its key(s) 152 (e.g., a join key) to compute a hash value, and use the hash value of the entry 160 to probe for a matching entry 156 in the hash table 144, which is used to provide an entry 162 of the results 146. The entry 162 may include an entry ID 164 of the entry 150 of the build table 140 and the matching entry ID 166 of the entry 160 of the probe table 142. As different keys may hash to the same hash value, the matching may check that the key(s) identified by the entry 156 in the hash table 144 match the key(s) of the probe table entry. The system 100 may use the GPUs 102A-102N to process one or more portions of the operation 138, which may increase the speed and/or the memory capacity available to the system 100 compared to using one GPU.

Distributed Building of Hash Tables

Figure 2:
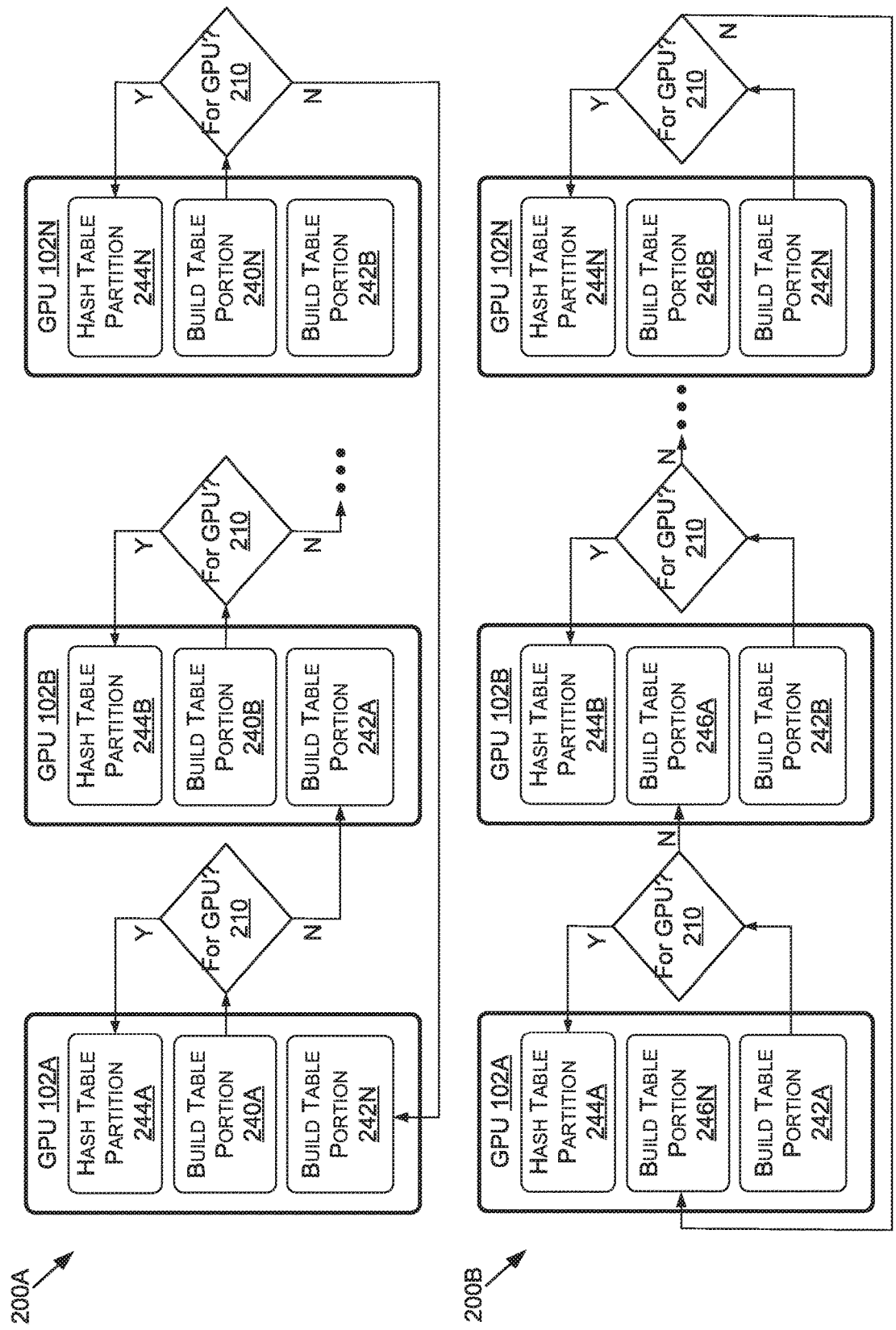
FIG. 2 is a diagram illustrating an example of distributed building of a hash table using multiple GPUs, in accordance with some embodiments of the present disclosure.
Figure 3:
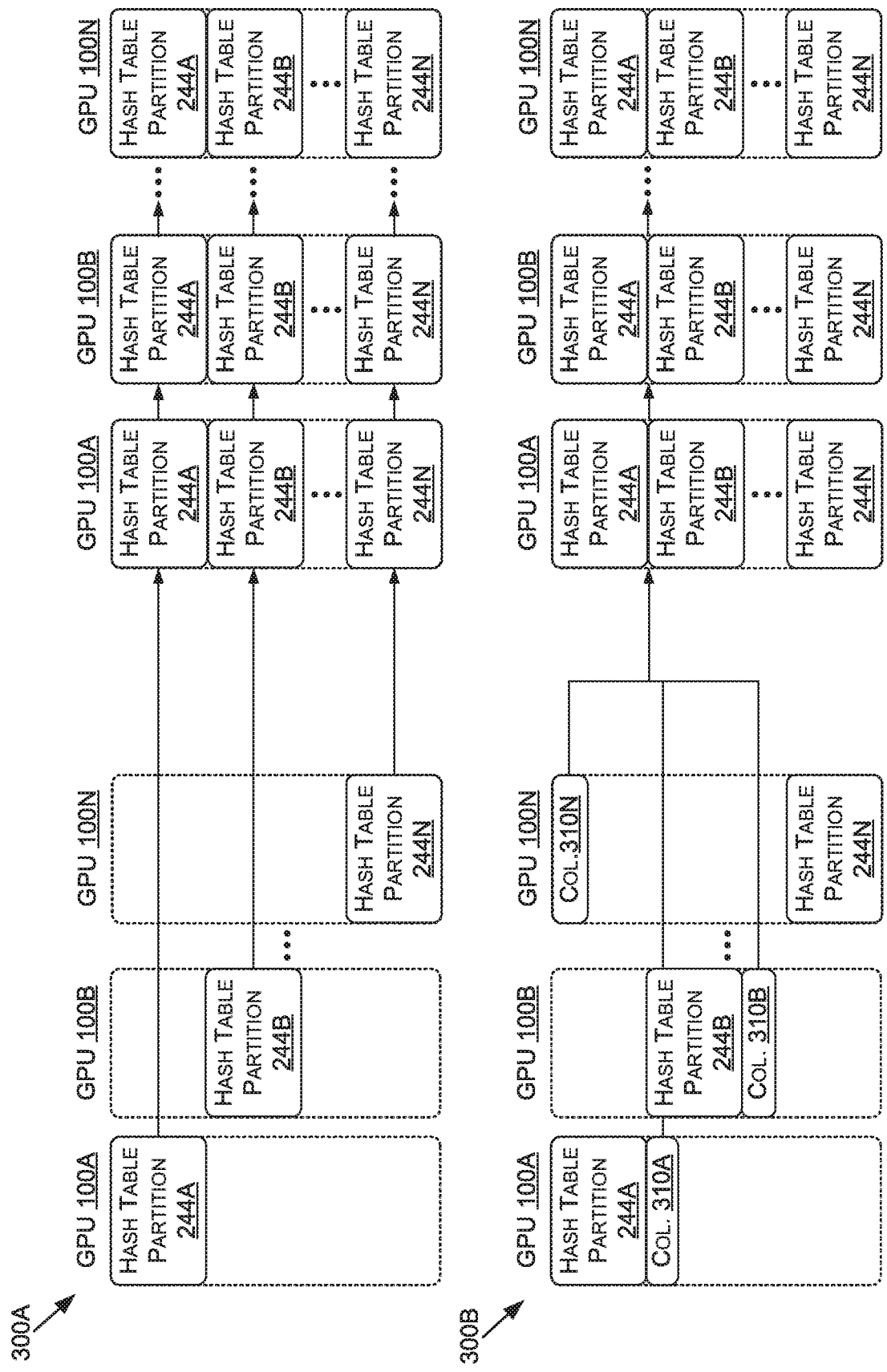
FIG. 3 is a diagram illustrating an example of replicating a hash table to multiple GPUs, in accordance with some embodiments of the present disclosure.

The disclosure provides, in part, approaches for building the hash table 144 in a distributed manner using the GPUs 102A-102N. Referring now to FIG. 2, FIG. 2 is a diagram illustrating an example of distributed building of the hash table 144 using the GPUs 102A-102N, in accordance with some embodiments of the present disclosure. However, the disclosure contemplates many potential variations for building the hash table 144 in a distributed manner. Further, many of these variations may be used for building either partitioned hash tables for distributed probing, or replicated hash tables for distributed probing. For example, to form the replicated hash tables, the partitioned hash tables may be merged across the GPUs 102A-102N. FIG. 3 is used to describe examples for merging hash table partitions.

The operations processor 134 may assign, or allocate, each of the GPUs 102A-102N a respective portion (e.g., one or more partitions) of the hash table 144 and the build table 140 for the operation 138. For example, the GPU 102A may be assigned the hash table partition 244A and the build table portion 240A, the GPU 102B may be assigned the hash table partition 244B and the build table portion 240B and the GPU 102N may be assigned the hash table partition 244N and the build table portion 240N.

A partition herein may refer to a contiguous allocation representing a part of a larger data structure. Each hash table partition 244A-244N may cover a different set of one or more buckets of values (e.g., contiguous values) in the hash table (e.g., using open addressing). Further partition sizes of the data structure may be substantially equivalent (e.g., equivalent when evenly divisible by the number of GPUs and/or partitions). Additionally, each allocation may be non-overlapping in various embodiments. For example, the hash table 144 may be partitioned into N partitions of substantially equal size where each GPU 102A-102N is allocated a respective partition and N may also represent the number of GPUs. The hash table partition 244A may have a global hash table index ranging from 0 to A-1, assuming a local partition size A, the hash table partition 244B may have a global hash table index ranging from A to B-1, assuming a local partition size B, and so on. Partitions of the build table 140 and the probe table 142 may be similarly arranged.

The allocated portions of the hash table 144 and/or the build table 140 may be distributed across the GPUs 102A-102N and/or may be in memory accessible to the corresponding ones of the GPUs 102A-102N. For example, the portion of the hash table 144 allocated to a particular GPU in the GPU memory 122 of that GPU. An example includes the hash table partition 244A of the GPU 102A being allocated in the GPU memory 122 of the GPU 102A. The portions of the build table 140 may be similarly arranged, or may be in the CPU memory 124 of one or more CPUs 104, such as the CPU 104 of a host system that includes the corresponding GPU storing an assigned a portion of the build table. In any example, the portions of the build table 140 may be stored in a GPU memory 122 or in a CPU memory 124 that is accessible to all of the GPUs 102A-102N or a subset thereof.

Generally, the storage locations of the portions of the hash table 144 and the build table 140 may vary based on the components, capabilities, and configuration of the system 100. For example, in some embodiments, more than one of the GPUs 102A-102N may be able to directly read from and write to the same CPU memory 124 and/or the same GPU memory 122, in which case the portions of the hash table 144 and/or the build table 140 for each GPU may be in the same memory. However, the GPUs may still share memory locations even where direct reads and writes are not supported, in which case bulk memory copies may be used, despite potentially lower efficiency.

In some examples, the GPUs 102A-102N may build the hash table 144 over a number of iterations. For example, FIG. 2 illustrates an iteration 200A and an iteration 200B of building the hash table 144 in a distributed manner using the GPUs 102A-102N. In the iteration 200A, the hash table builder 112 of each of the GPUs 102A-102N may (in parallel) read data from entries of the GPU's build table portion (e.g., a partition) and use the location determiner 118 of the GPU to make a determination 210, from the data, of which GPU is assigned the hash table partition for each entry and/or whether the GPU includes the hash table partition for the entry.

For example, the hash table builder 112 of the GPU 102A may read entries from the build table portion 240A and the location determiner 118 of the GPU 102A may make the determination 210 for each entry, of which GPU includes the hash table partition for insertion of the entry and/or whether the GPU 102A includes the hash table partition. This may include the location determiner 118 hashing the key(s) of the entry to compute a hash value, and using the hash value to derive a global location ID for the entry. As described herein, examples of the global location ID include a global hash value index of the hash table 144, a global bucket ID of the hash table 144, a partition ID of the hash table partition, and/or a GPU ID that identifies a corresponding location for insertion into the hash table 144. If the location determiner 118 of a GPU determines, using the global location ID, that the insertion is for the GPU's hash table partition, the GPU may insert a corresponding entry therein. Otherwise, the entry may not be inserted into the GPU's hash table partition, but may be inserted at the GPU associated with the insertion.

As a non-limiting example, the location determiner 118 may compute a partition size P_Size of a single partition using equation (1):

$$P\_Size = Hashtbl\_Size / K \quad (1)$$

where Hashtbl_Size is the size of the hash table 144 (e.g., the number of buckets), and K is the number of GPUs 102A-102N. The location determiner 118 may also compute a hash table index Hash_Idx using equation (2):

$$Hash\_Idx = Key\_Hash \% Hashtbl\_Size \quad (2)$$

Where Key_Hash is the hash of the key of an entry of the build table 140.

The location determiner 118 may also compute the GPU ID for a designated GPU as D_GPU using equation (3):

$$D\_GPU = Hash\_Idx / P\_Size \quad (3)$$

Each GPU may be assigned a GPU ID ranging from 0 to K−1 and if the location determiner 118 determines the D_GPU is equal to the GPU ID of the GPU and the GPU ID of the GPU is less than K−1, the hash table builder 112 may perform the insertion at the GPU. Further, if the location determiner 118 determines the D_GPU is greater than or equal to the GPU ID of the GPU and the GPU ID of the GPU is equal to K−1, the hash table builder 112 may perform the insertion at the GPU. Otherwise, the insertion may not be performed at the GPU so that it may be performed at the designated GPU. It is noted the equations and decisions may vary based on the configuration of the partitions and the hash table 144. In the present example, a global location ID may refer to or correspond to the Hash_Idx. The present example assumes that P_Size is constant for the partitions. However, in other examples P_Size may be different for different partitions.

As an example of using the equations (1), (2), and (3), assume K=16 and Hashtbl_Size=1024 such that P_Size=64 using equation (1). Next assume Key_Hash=793434 such that Hash_Idx=858 using equation (2). Thus, using equation (3), D_GPU=13. If the current GPU has a GPU ID of 10, the hash table builder 112 of the GPU may not perform the insertion at the GPU.

By determining whether an entry is to be inserted in a GPU's local hash table partition using a global location identifier, the insertions used to build the hash table 144 may be effectively distributed across the GPUs 102A-102N and parallelized, thereby reducing the impact of corresponding random memory accesses on the overall build-time of the hash table 144.

In further respects, based on the hash table builder 112 of a GPU processing at least a portion of the GPU's build table portion (e.g., the full local partition), the hash table builder 112 may use the interface manager 110 to provide a corresponding portion of build table data to another GPU for further processing. The build table data may correspond to build table portions 242A-242N in FIG. 2 and may be generated from or correspond to the build table portions 240A-240N respectively. For example, the interface manager 110 of the GPU 110A may provide the build table portion 242A (corresponding to the build table portion 240A) to the GPU 102B, the interface manager 110 of the GPU 110B may provide the build table portion 242B (corresponding to the build table portion 240B) to the GPU 102N, and the interface manager 110 of the GPU 110N may provide the build table portion 242N (corresponding to the build table portion 240N) to the GPU 102A. A GPU providing or passing data to another GPU may refer to the GPU pushing and/or transmitting the data to memory of the other GPU, and/or providing the GPU with access to the data in GPU and/or CPU memory. For example, where the GPUs are able to access each other's GPU memory, the data need not be handed off as the data may be remotely accessed by the other GPU. Further, in some examples, this handoff may be performed by the operations processor 134 and/or an exchange algorithm and the GPU may or may not be an active participant in the handoff.

The build table portions 242A-242N may be comprised of, for example, the build table data representative of one or more entries from the corresponding build table portions 240A-240N. This may include, for an entry, a payload and a corresponding key(s), a hash value of the key(s), the designated GPU ID for the entry, the hash table index for the entry, and/or the global location ID for the entry. Providing the hash value, the designated GPU ID, the hash table index, and/or the global location ID may reduce processing in some embodiments by allowing a different GPU to use those values without computing them.

In some examples, the build table portions 242A-242N may be generated from the build table portions 240A-240N, where the data filterer 120 of each GPU and/or the operations processor 134 may filter out entry data for the entries that the GPU has inserted into the GPUs hash table partition(s). This may allow subsequent operations to operate on fewer build table entries and/or reduce inter-GPU traffic. In some examples, the build table data comprising entry data for entries that are not filtered out may not be pushed directly to the next GPU. For example, the build table data may be first collected in a software managed local staging buffer. This may cause a load imbalance between the GPUs 102A-102N. Where the build table 140 is in the CPU memory 124, this load imbalance may be addressed by dividing the input into smaller partitions which are distributed in a round robin fashion across the GPUs 102A-102N.

The iteration 200B may be similar to the iteration 200A, but using the build table portions 242A-242N in place of the build table portions 240A-240N. For example, in the iteration 200B, the hash table builder 112 of each of the GPUs 102A-102N may (in parallel) read data from entries of the GPU's build table portion (e.g., partition) and use the location determiner 118 of the GPU to make the determination 210, from the data, of which GPU is assigned the hash table partition for each entry and/or whether the GPU includes the hash table partition for the entry.

Similarly, if the location determiner 118 of a GPU determines, using the global location ID, that the insertion is for the GPU's hash table partition, the GPU may insert a corresponding entry therein. Otherwise, the entry may not be inserted into the GPU's hash table partition, but may later be inserted at the GPU associated with the insertion.

Also similar to the iteration 200A, based on the hash table builder 112 of a GPU processing at least a portion of the GPU's build table portion (e.g., the full local partition), the hash table builder 112 may use the interface manager 110 to provide a corresponding portion of build table data to another GPU for further processing. The build table data may correspond to build table portions 246A-246N in FIG. 2 and may be generated from or correspond to the build table portions 242A-242N respectively.

The processing of build table portions and providing of build table data to a different GPU illustrated in the iterations 200A and 200B may continue until the hash table 144 is built. In any example, data that is exchanged between the GPUs 102A-102N (e.g., build table data) may be stored in and processed from one or more buffers thereof. In some examples, each of the GPUs 102A-102N includes multiple buffers used to double buffer the data. For example, in each iteration, such as the iteration 200A, the GPU 102A may process build table data, such as representing the build table portion 240A, from an active buffer, and receive build table data, such as representing the build table portion 242N, from another GPU in a staging buffer of the GPU 102A. In a next and/or subsequent iteration, such as the iteration 200B, the roles of the buffers may switch. Each of the GPUs 102A-102N may perform the buffering similar to the GPU 102A. Using buffering, the GPUs 102A-102N may overlap the processing of the data with the exchange of processed data between the GPUs 102A-102N.

In some examples, the build table data is provided to another GPU using an exchange or routing algorithm, such as a ring exchange. In some examples, the exchange or routing algorithm is configured such that each GPU sees all elements of the build table 140. In other examples, the exchange or routing algorithm is configured such that each GPU sees at least the elements of the build table 140 that the GPU is to insert into the GPU's hash table partition(s).

In a ring exchange, the GPUs 102A-102N may be logically arranged in a ring so that each GPU has a left and a right neighbor. For example, in FIG. 2, the left neighbor of GPU 102A may be the GPU 102N, while the right neighbor of the GPU 102A may be the GPU 102B. When each GPU provides the build table data to another GPU, the GPU may provide the data to the neighbor GPU in a same direction, such as to the right neighbor in FIG. 2. Using the ring exchange, the build table 140 may only be read once (e.g., via a comparably narrow CPU-GPU interconnect), and then each portion thereof may be passed around between the GPUs 102A-102N in a ring until each value from the build table is inserted in the hash table 144.

A bottleneck in building the hash table 144 may result from random memory accesses, which may result from performing atomic compare and swap operations and often have significantly lower throughput than inter-GPU bandwidth. Using approaches described herein, the throughput of this bottleneck may be reduced at least K-fold (compared to using a single GPU), where K is the number of GPUs 102A-102N, with each GPU 102A-102N passing K-times (worst case) over the build table 140 for insertions. On average, in each pass only 1/Kth of the build table 140 entries may require a compare and swap operation.

Although each of the GPUs 102A-100N is shown as including a single build table portion 240A-240N, in examples where a GPU initially includes multiple build table portions (e.g., partitions), when the GPU receives build table data from another GPU, it may process the received build table data along with an initial build table portion for insertions. For example, in the iteration 200A, the GPU 102A may start with the build table portion 240A and at least one other build table portion. However, the GPU 102A may not process all of the initial build table portions in the iteration 200A and may not provide all of the build table portions to a different GPU in the iteration 200A. Then, in the iteration 200B, the GPU 102A may process the build table portion 242N, along with one or more of the other initial build table portions. It is further noted that although FIG. 2 shows each of the GPUs 102A-102N as having a single hash table partition, any of the GPUs 102A-102N may be allocated any number of hash table partitions.

As an example of the forgoing, the operations processor 134 may partition the build table 140 into a number of partitions larger than the number of GPUs 102A-102N. In the iteration 200B, each GPU 102A-102N may read an initial build table partition and a build table partition received from the left neighbor GPU in the iteration 200A. Then, all build table entries that have passed the filtering by the data filterer 120 and did not fall into the hash table partition of the current GPU may be pushed to the right neighbor (e.g., using a local staging buffer). This approach may be beneficial where inter-GPU bandwidth is higher than the bandwidth of the link accessing the build table 140, because the traffic over the narrow link may be smoothed over a larger fraction.

In some embodiments, when the location determiner 118 of one or more of the GPUs 102A-102N determines (e.g., using the determination 210) the designated GPU for an insertion of an entry and the GPU is not the designated GPU, the entry data (e.g., payload, hash value, and/or key(s), etc.) for that entry may be provided by the GPU to the designated GPU based on the determination. For example, the entry data may be provided (e.g., pushed) directly to the designated GPU (e.g., to a staging buffer thereof) and the designated GPU may perform the insertion of the corresponding entry into a local partition of the hash table 144. This may be implemented where each of the GPUs 102A-102N manages K−1 staging buffers. As another example, the GPU may perform a remote insertion of the entry into the partition of the hash table 144 of the designated GPU, such as where the system 100 supports atomic operations to peer GPUs.

In implementations where remote insertions are possible, the build table portions 240A-240N may not be exchanged between the GPUs 102A-102N. For example, the iteration 200B may not be needed and the hash table 144 may be built in a single pass over the build table 140. However, in any example, remote insertions may be performed by some of the GPUs 102A-102N and not others, and/or may be performed for some scans of an entry in the build table 140 and not others, depending on various potential factors.

Merging of Distributed Hash Tables

The disclosure provides, in part, approaches for merging hash tables that are distributed across multiple GPUs, such as the GPUs 102A-102N. For example, each of the GPUs 102A-102N may include the respective hash table partition(s) allocated to the GPU by the operations processor 134 and constructed from the build table 140. The hash table partitions may be built using approaches described herein, or other suitable approaches. Where the hash table partitions probed in a distributed manner, approaches described herein for distributed probing of the hash table using hash table partitions may be employed. However, in other embodiments, the hash table partitions may be merged to replicate the hash table 144 on one or more of the GPUs 102A-102N, and the replicated hash table copies may be used for distributed probing of the hash table.

Referring now to FIG. 3, FIG. 3 is a diagram illustrating an example of replicating the hash table 144 to the GPUs 102A-102N, in accordance with some embodiments of the present disclosure. The operations processor 134 may merge the partitions of the hash table 144 using one or more phases, such as a phase 300A and a phase 300B. In the phase 300A, each of the GPUs 102A-102N may push (e.g., in parallel) the hash table partition assigned to it to the output hash table of all other GPUs. For example, the GPU 102A may push the hash table partition 244A to all of the GPUs 102A-102N, including itself, the GPU 102B may push the hash table partition 244B to all of the GPUs 102A-102N, including itself, and the GPU 102N may push the hash table partition 244N to all of the GPUs 102A-102N, including itself, as shown in FIG. 3. In embodiments where each of the GPUs 102A-102N respectively owns a non-overlapping partition of the hash table 144, the phase 300A may be performed conflict free with contiguous bulk peer-to-peer memory copy or coalesced writes. Also in some embodiments, each of the GPUs 102A-102N may start the phase 300A as soon as it has completed processing its final build table data, such as where the phase 300A is performed out of place (e.g., the output hash table of each GPU is a separate initially empty data structure).

The phase 300B may be performed in embodiments where the hash table partitions 244A-244N include collisions, such as collisions 310A, 310B, and 310N. For example, due to hash table collisions, each of the hash table partitions 244A-244N may have used some hash table entries outside of the hash table partition's assigned range. In the example shown, linear probing may be used for all of the hash table entries outside the assigned range, such that the entries are consecutive in the GPU memory 122 of the GPU and start at the entry directly after the end of the assigned range. To ensure that collisions spilling over the end of a hash table partition's assigned range are appended after the hash table partition's assigned range and not inserted in the assigned range (e.g., due to a cyclic wrap around), each GPU may allocate a data structure that is larger than its assigned range (e.g., the size of the full hash table). After a global barrier, these entries may be handled in the phase 300B.

In the phase 300B, the interface manager 110 of each of the GPUs 102A-102N may perform a linear scan of the collisions 310A-310N of the hash table partitions 244A-244N (e.g., for each GPU N linear scans for N partitions). In doing so, the interface manager 110 may read each overflowing entry directly from each peer hash table partition and start at the hash table entry just after the end of the processed partition. The interface manager 110 may run a linear scan until the first empty entry is found, because at that point all overflowing conflicts may be resolved. Each key/entry found by the linear scan may be inserted by the hash table builder 112 in the output hash table of the local GPU 102A-102N, as indicated in FIG. 3.

To result in a replicated hash table for each of the GPUs 102A-102N, each GPU may insert the overflows of all other GPUs, which may include the GPU's own overflow due to an out of place merge. Thus, the phase 300B may include performing the insertions of the overflows in parallel by the GPUs, but redundantly on each GPU. After the phase 300B, each of the GPUs 102A-102N may have a full copy of the hash table 144 in local memory (e.g., the GPU memory 122 of the GPU).

Distributed Probing of Hash Tables

The disclosure further provides, in part, approaches for probing hash tables that are distributed across multiple GPUs, such as the GPUs 102A-102N. For example, each of the GPUs 102A-102N may include the respective hash table partition(s) constructed from the build table 140. The hash table partitions may be built using approaches described herein, or other suitable approaches. Where the hash table partitions are used for distributed probing, approaches described herein for distributed probing of the hash table using hash table partitions may be employed. However, the disclosure also provides for distributed probing of the hash table using multiple full local copies of the hash table, such as where hash table partitions are merged across GPUs using approaches described herein (e.g., with FIG. 3), or other suitable approaches.

The operations processor 134 may assign and/or distribute to each of the GPUs 102A-102N a respective portion (e.g., one or more partitions) of the probe table 142 for the operation 138 and each of the GPUs 102A-102N may use the hash table prober 114 of the GPU to probe the hash table 144 using the GPU's probe table portion(s).

Similar to the build table portions described with respect to FIG. 2, the portions of the probe table 142 may be distributed across the GPUs 102A-102N and/or may be stored in memory accessible to the corresponding ones of the GPUs 102A-102N. For example, the portion of the probe table 142 assigned to a particular GPU may be maintained in the GPU memory 122 of that GPU, or in the CPU memory 124 of one or more CPUs 104, such as the CPU 104 of a host system that includes the corresponding GPU assigned to a portion of the probe table. In any example, the portions of the probe table 142 may be in a GPU memory 122 or in a CPU memory 124 that is accessible to all of the GPUs 102A-102N or a subset thereof. For example, with the probe table 142 stored in the CPU memory 124, the operations processor 134 may partition the probe table 142 substantially evenly (e.g., equivalent when evenly divisible by the number of GPUs and/or partitions) across all of the GPUs 102A-102N. The hash table prober 114 of each of the GPUs 102A-102N may (in parallel) read the entries/values from its assigned probe table portion(s) and locally probe the hash table 144. Where each value from the probe table 142 is only read once, all of the GPUs 102A-102N may directly read the values from pinned system memory or the values may be processed in a staging pipeline. If a probe results in a matching key(s) in the hash table 144, the results manager 116 may materialize the result for the results 146.

Various examples are provided for probing hash tables that are distributed across the GPUs 102A-102N. In some approaches, hash table portions may be exchanged between the GPUs 102A-102N and probe table portions may be pinned to the GPUs 102A-102N (not exchanged). In other approaches, both hash table portions and probe table portions may be pinned to the GPUs 102A-102N. In still other approaches, hash table portions may be pinned to the GPUs 102A-102N and probe table portions may be exchanged between the GPUs 102A-102N.

Figure 4:
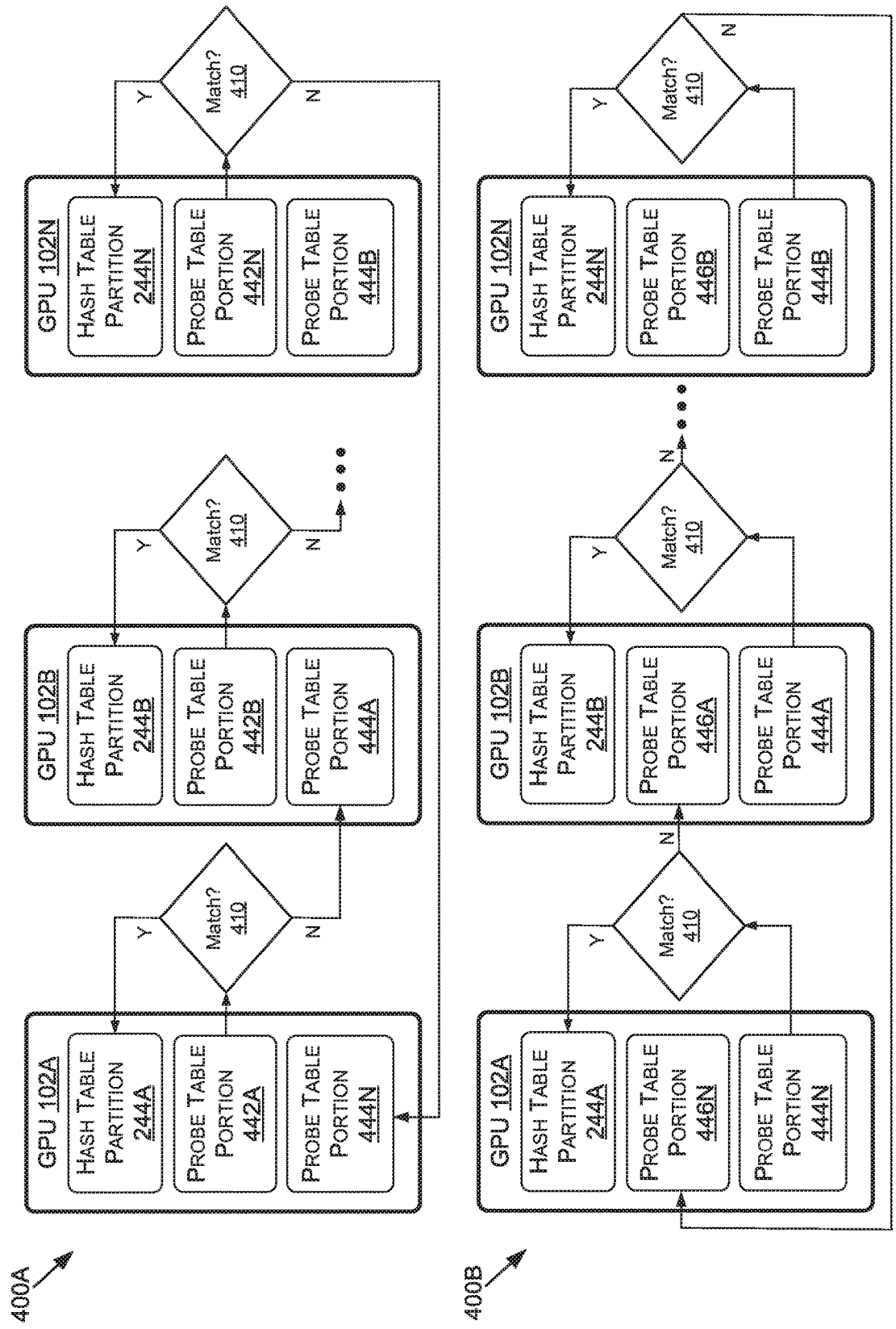
FIG. 4 is a diagram illustrating an example of distributed probing of a hash table using multiple GPUs and pinned hash table partitions, in accordance with some embodiments of the present disclosure.

Referring now to FIG. 4, FIG. 4 is a diagram illustrating an example of distributed probing of a hash table using multiple GPUs and pinned hash table partitions, in accordance with some embodiments of the present disclosure.

The operations processor 134 may assign, or allocate, each of the GPUs 102A-102N a respective portion (e.g., one or more partitions) of the hash table 144 and the probe table 142 for the operation 138. For example, the GPU 102A may be assigned the hash table partition 244A and the probe table portion 442A, the GPU 102B may be assigned the hash table partition 244B and the probe table portion 442B, and the GPU 102N may be assigned the hash table partition 244N and the probe table portion 442N.

In various examples, the operations processor 134 partitions the probe table 142 into N partitions of substantially equal size where each of the GPUs 102A-102N are allocated a respective partition and N may also represent the number of GPUs. The assigned portions of the hash table 144 and/or the probe table 142 may be distributed across the GPUs 102A-102N and/or may be stored in memory accessible to the corresponding ones of the GPUs 102A-102N. For example, the portion of the hash table 144 assigned to a particular GPU may be maintained in the GPU memory 122 of that GPU. An example includes the hash table partition 244A of the GPU 102A being maintained in the GPU memory 122 of the GPU 102A. The portions of the probe table 142 may be similarly arranged, or may be in the CPU memory 124 of one or more CPUs 104, such as the CPU 104 of a host system that includes the corresponding GPU assigned to a portion of the probe table 142. In any example, the portions of the probe table 142 may be in a GPU memory 122 or in a CPU memory 124 that is accessible to all of the GPUS 102A-102N or a subset thereof. Generally, the storage locations of the portions of the hash table 144 and the probe table 142 may vary based on the components, capabilities, and configuration of the system 100.

The GPUs 102A-102N may probe the hash table 144 over a number of iterations. For example, FIG. 4 illustrates an iteration 400A and an iteration 400B of probing the hash table 144 in a distributed manner using the GPUs 102A-102N. In the iteration 400A, the hash table prober 114 of each of the GPUs 102A-102N may (e.g., in parallel) scan the assigned probe table portion(s) and may perform a probe to the hash table partition stored on that GPU (e.g., when a location for an entry corresponds to a hash table portion/partition). For example, the hash table prober 114 of the GPU 102A may scan entries from the probe table portion 442A and the hash table prober 114 of the GPU 102A may make a determination 410, for each entry, whether the GPU 102A may include a matching entry in the hash table partition 244A. This may include the hash table prober 114 hashing the key(s) of the entry to compute a hash value, and using the hash value to determine whether the hash table partition 244A might include a matching entry (e.g., based on the global location ID).

In some examples, the determination 410 may be performed using the location determiner 118. For example, the hash table prober 114 of each of the GPUs 102A-102N may use the location determiner 118 of the GPU to make the determination 410 of which GPU is assigned the hash table partition for each entry and/or whether the GPU includes the hash table partition for the entry. For example, the hash table prober 114 of the GPU 102A may read entries from the probe table portion 442A and the location determiner 118 of the GPU 102A may make the determination 410 for each entry, which GPU includes the hash table partition for probing of the entry and/or whether the GPU 102A includes the hash table partition. This may include the location determiner 118 hashing the key(s) of the entry to compute a hash value, and using the hash value to derive the global location ID, such as a global hash value index of the hash table 144, a global bucket ID of the hash table 144, a partition ID of the hash table 144, and/or a GPU ID that identifies a corresponding location for probing the hash table 144. If the location determiner 118 of a GPU determines, using the global location ID, that the probing is for a GPU's hash table partition, the GPU may probe for a corresponding entry therein. Otherwise, the entry may not be used to probe the GPU's hash table partition, but may later be used to probe the GPU that includes the corresponding hash table partition.

In examples where the location determiner 118 is used by the hash table prober 114, the location determiner 118 may use the equations (1), (2), and (3), and/or other suitable equations to determine the global location IDs. By determining whether an entry is to be probed against a GPU's local hash table partition using a global location ID, the probes of the hash table 144 may be parallelized across the GPUs 102A-102N, thereby reducing the impact of corresponding random memory accesses on the overall probe-time of the hash table 144.

In further respects, based on the hash table prober 114 of a GPU processing at least a portion of the GPU's probe table portion (e.g., a full local partition), the hash table prober 114 may use the interface manager 110 to provide probe table data (e.g., the full portion and/or non-probed or matched portions) to another GPU for further processing. The probe table data may represent probe table portions 444A-444N in FIG. 4 and may be generated from or correspond to the probe table portions 442A-442N respectively. For example, the interface manager 110 of the GPU 110A may provide the probe table portion 444A (corresponding to the probe table portion 442A) to the GPU 102B, the interface manager 110 of the GPU 110B may provide the probe table portion 444B (corresponding to the probe table portion 442B) to the GPU 102N, and the interface manager 110 of the GPU 110N may provide or pass the probe table portion 444N (corresponding to the probe table portion 442N) to the GPU 102A. A GPU providing or passing data to another GPU may refer to the GPU pushing and/or transmitting the data to memory of the other GPU, and/or providing the GPU with access to the data.

The probe table portions 444A-444N may be comprised of, for example, the probe table data representative of one or more entries from the corresponding probe table portions 442A-442N. This may include, for an entry, a corresponding key(s), a hash value of the key(s), the designated GPU ID for the entry, the hash table index for the entry, and/or the global location ID for the entry. Providing the hash value, the designated GPU ID, the hash table index, and/or the global location ID may reduce processing in some embodiments by allowing a different GPU to use those values without computing them.

In some examples, the probe table portions 444A-444N may be generated from the probe table portions 442A-442N, where the data filterer 120 of each GPU and/or the operations processor 134 may filter out entry data from the entries that the GPU has matched to the GPUs hash table partition(s) and/or entries thereof. This may allow subsequent operations to operate on fewer probe table entries and/or reduce inter-GPU traffic. In some examples, the probe table data comprising entry data for entries that are filtered out may not be pushed to the next GPU. For example, the probe table data may be first collected in a software managed staging buffer. This may cause a load imbalance between the GPUs 102A-102N. Where the probe table 142 is in the CPU memory 124, this load imbalance may be addressed by dividing the input into smaller partitions which are distributed in a round robin fashion across the GPUs 102A-102N.

The iteration 400B may be similar to the iteration 400A, but using the probe table portions 444A-444N in place of the probe table portions 442A-442N. For example, in the iteration 400B, the hash table prober 114 of each of the GPUs 102A-102N may (in parallel) scan the assigned probe table portion(s) and perform a join with the hash table partition(s) stored on that GPU (e.g., when a location for an entry corresponds to a hash table portion/partition). Similarly, the location determiner 118 may be used and if the location determiner 118 determines, using the global location ID, that an entry includes a hash value in the GPU's hash table partition, the GPU may probe against the GPU's hash table partition. Otherwise, the entry may not be used to probe the GPU's hash table partition, but may later be used to probe the GPU that includes the corresponding hash table partition or location for the probe.

Also similar to the iteration 400A, based on the hash table prober 114 of a GPU processing at least a portion of the GPU's probe table portion (e.g., a full local partition), the hash table prober 114 may use the interface manager 110 to provide probe table data (e.g., the full portion and/or non-probed portions) to another GPU for further processing. These processed portions may be representative of probe table portions 446A-446N in FIG. 4 and may be generated from or correspond to the probe table portions 444A-444N respectively.

The processing of probe table portions and providing of probe table data to a different GPU illustrated in the iterations 400A and 400B may continue until all entries from the probe table are probed against the hash table 144. In any example, data that is exchanged between the GPUs 102A-102N (e.g., probe table data) may be stored in and processed from one or more buffers thereof. In some examples, each of the GPUs 102A-102N includes multiple buffers used to double buffer the data. For example, in each iteration, such as the iteration 400A, the GPU 102A may process probe table data, such as representing the probe table portion 442A, from an active buffer, and receive probe table data, such as representing the probe table portion 444N, from another GPU in a staging buffer of the GPU 102A. In a next and/or subsequent iteration, such as the iteration 400B, the roles of the buffers may switch. Each of the GPUs 102A-102N may perform the buffering similar to the GPU 102A. Using buffering, the GPUs 102A-102N may overlap the processing of the data with the exchange of processed data between the GPUs 102A-102N.

In some examples, the probe table data is provided to another GPU using an exchange or routing algorithm, such as the ring exchange described herein. In some examples, the exchange or routing algorithm is configured such that each GPU sees all elements of the probe table 142. In other examples, each GPU may not see all elements of the probe table 142 and the exchange or routing algorithm may be configured such that each GPU sees at least the elements of the probe table 142 the GPU is to probe against the GPU's hash table partition(s).

Another example of an exchange or routing algorithm is a hierarchical exchange. In a hierarchical exchange, the operations processor 134 may logically group the GPUs 102A-102N into sets of M GPUs, where M is less than the number of GPUs N. At the outset of probing the hash table 144, each set S of the GPUs 102A-102N may collectively include a full copy the probe table 142 across a number of partitions in the GPU memory 122 of the GPUs in the set, so that the probe table partitions are replicated in each set S. When exchanging probe table data between GPUs, the partitions may be exchanged (e.g., after filtering in a round robin fashion) within each set S. This approach may reduce the number of passes of probe table data from N to M, which may be desirable for GPU-GPU connection topologies that may not provide fast bisection bandwidth between all GPUs, and are effectively limited by communication throughput. For example, the pressure from an all-to-all interconnect between the GPUs 102A-102N may be offloaded, as the GPUs may only communicate all-to-all during the first iteration of probing the hash table 144, but in the next M−1 iterations, the GPUs may communicate within the sets. The hierarchical exchange may similarly be used for building the hash table 144, such approaches described herein (e.g., using the build table 140 in place of the probe table 142).

Although each of the GPUs 102A-102N is shown as including a single probe table portion 442A-442N, in examples where a GPU initially includes multiple probe table portions (e.g., partitions), when the GPU receives probe table data from another GPU, it may process the received probe table data along with an initial probe table portion. For example, in the iteration 400A, the GPU 102A may start with the probe table portion 442A and at least one other initial probe table portion. Then, in the iteration 400B, the GPU 102A may process the probe table portion 444N, along with one or more of the other initial probe table portions. It is further noted that although FIG. 4 shows each of the GPUs 102A-102N having a single hash table partition, any of the GPUs 102A-102N may be allocated any number of hash table partitions.

As an example, in the iteration 400A, the hash table prober 114 of each of the GPUs 102A-102N may scan an assigned probe table partition(s) and perform a probe against the partial hash table stored on that GPU (e.g., when a location for an entry corresponds to a hash table portion/partition). In parallel, the probe table data may be sent to a peer GPU in a round robin fashion. This may be repeated until all probe table partitions are processed on all of the GPUs 102A-102N. Similar to embodiments of the build phase, where the data filterer 120 filters the probe table 142, each of the GPUs 102A-102N may push probe table data that only represents the keys and values which have not been filtered out to the staging buffer of the next GPU. Using this approach inter-GPU traffic may be minimized and subsequent passes may operate on fewer values.

While FIG. 4 shows an approach where hash table partitions are pinned to the GPUs 102A-102N and probe table portions are exchanged between the GPUs 102A-102N, as described herein, hash table data may be exchanged between the GPUs 102A-102N and probe table portions may be pinned to the GPUs 102A-102N. For example, referring now to FIG. 5, FIG. 5 is a diagram illustrating an example of distributed probing of a hash table using the GPUs 102A-102N and pinned probe table portions 542A-542N, in accordance with some embodiments of the present disclosure.

Figure 5:
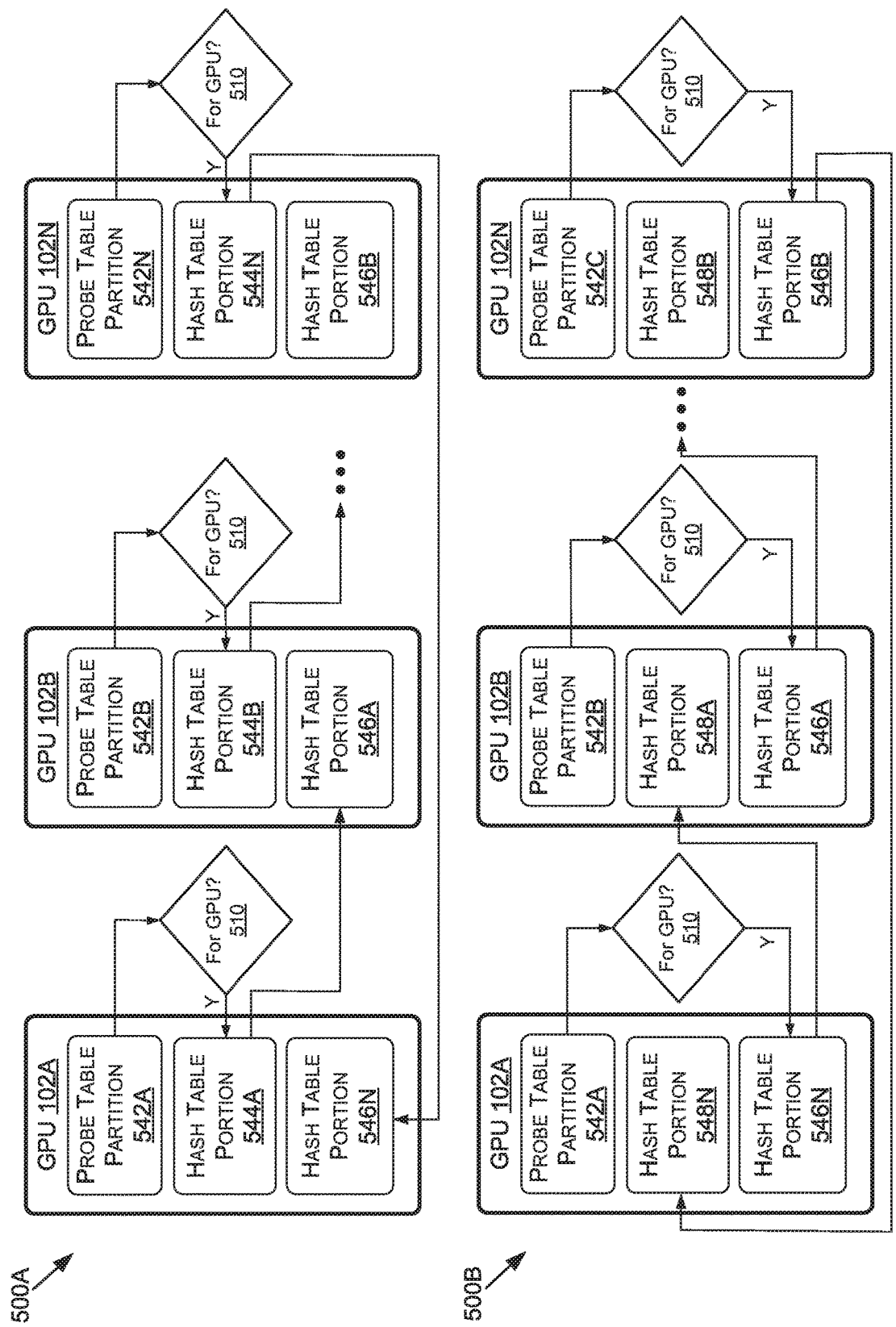
FIG. 5 is a diagram illustrating an example of distributed probing of a hash table using multiple GPUs and pinned probe table portions, in accordance with some embodiments of the present disclosure.

The iteration 500A and the iteration 500B in FIG. 5 may be similar to the iteration 400A and the iteration 400B in FIG. 4 respectively. However, in the iteration 500A, probe table portions 542A-542N may be scanned for probing against the hash table portions 544A-544N, and hash table portions 546A-546N may correspond to (e.g., be generated from) the hash table portions 544A-544N and be exchanged by the GPUs 102A-102N. In the iteration 500B, the probe table portions 542A-542N may be scanned for probing against the exchanged hash table portions 546A-546N, and hash table portions 548A-548N may correspond to (e.g., be generated from) the hash table portions 546A-546N and be exchanged by the GPUs 102A-102N. In doing so, a determination(s) 510 may be made for each GPU, which may be similar to the determination(s) 410.

As an example, in the iteration 500A, each of the GPUs 102A-102N may scan the assigned one(s) of the probe table portion(s) 542A-542N and may perform a probe against the hash table portions 544A-544N stored on that GPU (e.g., when a location for an entry corresponds to a hash table portion/partition). In parallel, the corresponding one(s) of the hash table portions 546A-546N may be sent to and/or provided to a peer GPU, such as in a round robin fashion. This may be repeated until all hash table portions are processed on all GPUs or all probe table entries are matched to the hash table 144. For example, where the GPUs 102A-102N include N GPUs, the hash table 144 may be split into N partitions (one per GPU). In this example, there may be N passes over the probe table 142. However, on each pass the corresponding hash table partition may only be accessed for a subset of keys from the probe table portions 542A-542N. In particular, the accesses for a GPU may be for those keys with a hash value that falls into the hash table partition range at the GPU. As such, the total number of random accesses across all the GPUs 102A-102N across all N passes may be equal to the total number of keys in the probe table 142.

The performance of the above approach may be limited by the slowest of the following timings in each iteration: (1) the partition size of the probe table 142/the sequential access to the probe table, which is either single GPU memory throughput of the GPU memory 122 or memory throughput of the GPU accessing CPU memory (to scan the probe table partitions); (2) the partition size of the probe table 142/the random single GPU memory throughput of the GPU memory 122/N (to access the hash table 144, on average 1/N of the values would fall into the current hash table partition); and (3) the partition size of the hash table 144/the per-GPU bisection bandwidth (to exchange the hash table partitions). If the probe table is in GPU memory in practice, the sequential GPU memory access is often an order of magnitude faster than the random GPU memory access, such that (2) or (3) will be the dominating factors, depending on the sizes of the probe table 142 and the hash table 144. If the probe table is in CPU memory, then (1) may become the bottleneck.

As described herein, in some approaches, both hash table portions and probe table portions may be pinned to the GPUs 102A-102N. For example, when the location determiner 118 of the GPU 102A makes a determination 410/510 of which GPU is assigned the hash table partition for an entry (e.g., depending of the hash index) and the GPU is different than the GPU 102A, the GPU 102A may directly access the corresponding GPU to perform the probe on a hash table partition. In particular, the GPU 102A may remotely access the GPU memory 122 of the corresponding GPU. The other GPUs 102B-102N may behave similarly. Direct accesses to a remote GPU memory 122 may be performed by mapping the remote GPU memory 122 into the addressing space of the GPU performing the remote access, which may be facilitated using Unified Memory. Unified Memory may refer to a single memory address space accessible from any of the GPUs 102A-102N and/or the CPU(s) 104. Using Unified Memory, applications may allocate data that can be read from or written to code running on either the CPUs or the GPUs. As another example, rather than remotely performing a direct access, the GPU 102A may provide the probe table data for the entry to the corresponding GPU for probing (e.g., to a staging buffer thereof) by the receiving GPU. The other GPUs 102B-102N may behave similarly.

While in various examples, the hash table portions and/or probe table portions may be pinned to the GPUs 102A-102N, in other examples, some hash table portions and/or probe table portions may be exchanged between the GPUs 102A-102N and others may be pinned. Further, remote accesses of a GPU memory 122 for probing may be integrated into any described example, and may be performed for some of the GPUs 102A-102N and not others, and/or may be performed for some scans of an entry in the probe table 142 and not others, depending on various potential factors. Thus, various hybrids and combinations of the approaches described herein are possible.

Rearranging Probe Table Entries for Distributed Probing

As described herein, the operations processor 134 may assign, or allocate, each of the GPUs 102A-102N a respective portion (e.g., one or more partitions) of the probe table 142 for the operation 138 and each of the GPUs 102A-102N may use the hash table prober 114 of the GPU to probe the hash table 144 using the GPU's probe table portion(s). In any example, this may include the operations processor 134 rearranging entries of the probe table 142 at the outset of the probe phase (before probing occurs) to reduce inter-GPU communications. In various examples, the operations processor 134 may determine a portion of the probe table 142 for a GPU based at least in part on a range of the hash table 144 assigned to the GPU. For example, the operations processor 134 may, using the global location identifier, assign an entry to the GPU based on the entry falling within a range of the hash table 144 assigned to the GPU (e.g., in the GPU memory 122 of the GPU). Using this approach, the operations processor 134 may rearrange one or more entries for the probe table 142 into a number of partitions (e.g., equal to a number of the GPUs 102A-102N), where each partition may only hold keys that fall into the range of the hash table partition allocated to the corresponding GPU. The rearranging may be performed on the CPU(s) 104 and/or on the GPUs 102A-102N.

In some examples, to rearrange entries of the probe table 142, probe table data may not be moved in place, but may be copied from the probe table 142 to consecutive locations in the corresponding probe table partition (e.g., to maximize throughput). For each GPU, shared memory may be used to stage the probe table partitions to avoid random memory access to GPU global memory. The GPUs 102A-102N may each fill the probe table partitions, such as by generating 0-N–1 buckets, where N is the number of GPUs. After the GPUs 102A-102N fill the probe table partitions, these partitions may be exchanged (e.g., all-to-all between the GPUs with each GPU sending its bucket K to GPU K) and concatenated (e.g., to form a single partition from the buckets form the other GPUs) so that in the end each GPU has a probe table partition with keys that fall into the range of is local hash table partition(s). Using this approach, each probe table partition index may be tied to a corresponding hash table partition range (e.g., by hashing a key and dividing by the hash table partition size to determine the probe table partition index for an entry).

Materializing Results of Distributed Probing of Hash Tables

The disclosure further provides, in part, approaches for materializing results of probing hash tables that are distributed across multiple GPUs, such as the GPUs 102A-102N. For example, each of the GPUs 102A-102N may include respective hash table partition(s) of the hash table 144 and/or replicated copies of the hash table 144. The hash table 144 may be probed by the GPUs 102A-102N using approaches described herein, or other suitable approaches to produce the results 146.

Figure 6:
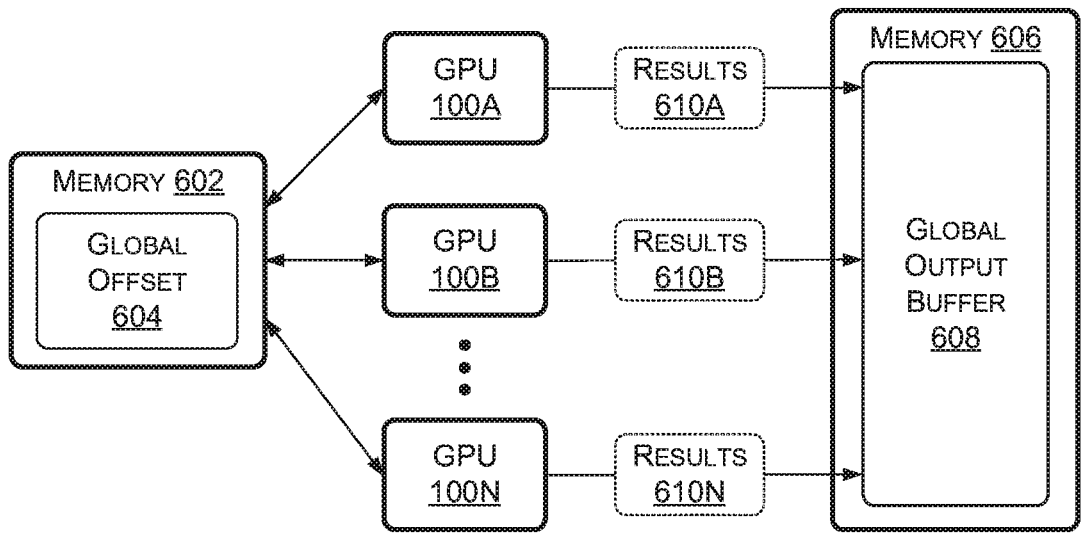
FIG. 6 is a diagram illustrating an example of materializing results of distributed probing of a hash table using multiple GPUs and a global offset variable, in accordance with some embodiments of the present disclosure.

Referring now to FIG. 6, FIG. 6 is a diagram illustrating an example of materializing results of distributed probing of the hash table 144 using the GPUs 102A-102N and a global offset variable 604, in accordance with some embodiments of the present disclosure. The global offset variable 604 may be used by the GPUs 102A-102N to materialize at least some results to at least a memory 606 that is shared between the GPUs 102A-102N. For example, the GPUs 102A-102N may materialize the results 146 to a global output buffer 608 in the memory 606. The memory 606 may be comprised of CPU memory or GPU memory accessible by each of the GPUs.

In various examples, the global offset variable 604 may reside in a memory 602 which is the same or different than the memory 606 and may comprise CPU memory or GPU memory. In some embodiments, the global offset variable 604 resides in the GPU memory 122 of one or more of the GPUs 102A-102N that is accessible by each of the GPUs 102A-102N and may be used to coordinate writes to the global output buffer 608. The global offset variable 604 may comprise a variable and values of the variable may be used to track and define a global offset for where results should be written to the global output buffer 608. For example, to materialize the results 146, each of the GPUs 102A-102N may use an atomic operation with system wide scope that increments the global offset variable 604 by a number of the results 146 (or values) to be materialized by the GPU. The corresponding results 146 may then be written to the global output buffer 608 at a value(s) of the global offset variable 604 that is returned by the atomic operation. For example, the GPU 102A may write results 610A of the results 146 to the global output buffer 608 at a location defined by the global offset variable 604 and the global offset variable 604 may be incremented based on a number of the results 610A. Similarly, the GPU 102B may write results 610B of the results 146 to the global output buffer 608 at a location defined by the global offset variable 604 and the global offset variable 604 may be incremented based on a number of the results 610B. Further, the GPU 102N may write results 610N of the results 146 to the global output buffer 608 at a location defined by the global offset variable 604 and the global offset variable 604 may be incremented based on a number of the results 610N.

Figure 7:
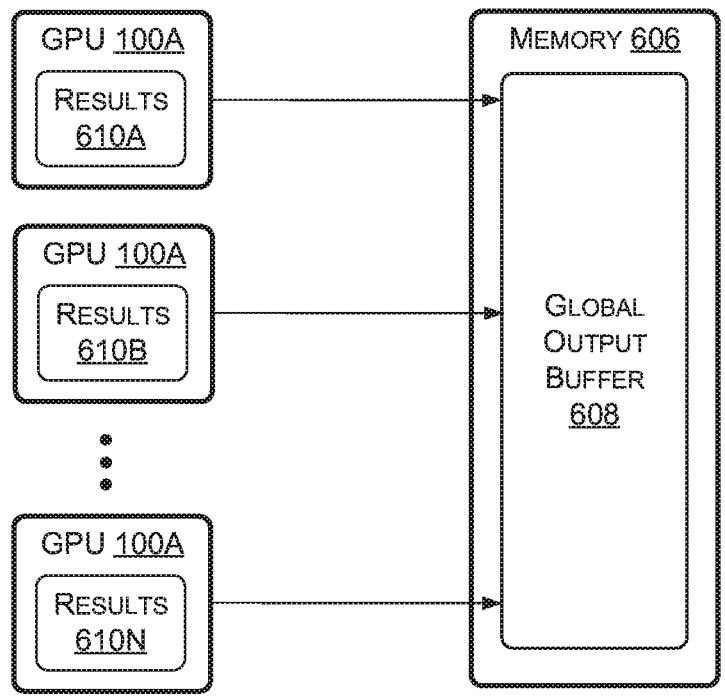
FIG. 7 is a diagram illustrating an example of materializing results of distributed probing of a hash table using multiple GPUs and sizes of local output buffers, in accordance with some embodiments of the present disclosure.

Referring now to FIG. 7, FIG. 7 is a diagram illustrating an example of materializing results of distributed probing of a hash table using multiple GPUs and sizes of local output buffers, in accordance with some embodiments of the present disclosure. Where a global offset variable is not employed, such as where one or more of the GPUs 102A-102N are unable to access or use the global offset variable 604 or for performance reasons, a GPU may materialize partial results it produces in local memory, such as local GPU memory. For example, the GPU 102A may materialize the results 610A to a local output buffer of the GPU 102A, the GPU 102B may materialize the results 610B to a local output buffer of the GPU 102B, and the GPU 102N may materialize the results 610N to a local output buffer of the GPU 102N. The GPUs 102A-102N may further materialize the results 610A-610N from the local output buffers to the global output buffer 608 to form the results 146. To do so, the GPUs 102A-102N may compute an exclusive prefix sum of the local output buffer sizes.

To illustrate an exclusive prefix sum, assume the GPUs 102A-102N include four GPUs with the following local output buffer sizes: 5, 8, 2, and 10. The exclusive prefix sum of this array would be 0, 5, 13, 15, where the current size value is excluded from the sum and everything prior to the current size value is summed. For example, for the fourth entry (10), the exclusive prefix sum may be computed as 5+8+2. This prefix sum sequence may define the global offsets for the portions of the results 146 in each local output buffer respectively. For example, where the GPU 102A is the GPU with the local output buffer size of 5 in the example above, the results 610A may be materialized using a global offset of 0 (e.g., indicating a starting address of the global output buffer 608). Each of the GPUs 102A-102N may write (e.g., push in parallel) a corresponding portion of the results 146 to the global output buffer 608 using the corresponding global offset value for the portion of the results 146.

In various embodiments, the approaches of FIG. 6 and FIG. 7 may be combined, such as on systems with multiple islands of all-to-all connected GPUs. For example, the approach of FIG. 6 may be used within each all-to-all connected island, then the approach of FIG. 7 may be used to merge the portions of the results 146 from the islands. In further examples, the global offset variable 604 may be allocated in CUDA Unified Memory and software emulation of atomics with system wide scope may be used to implement the approach of FIG. 6.

Figure 8:
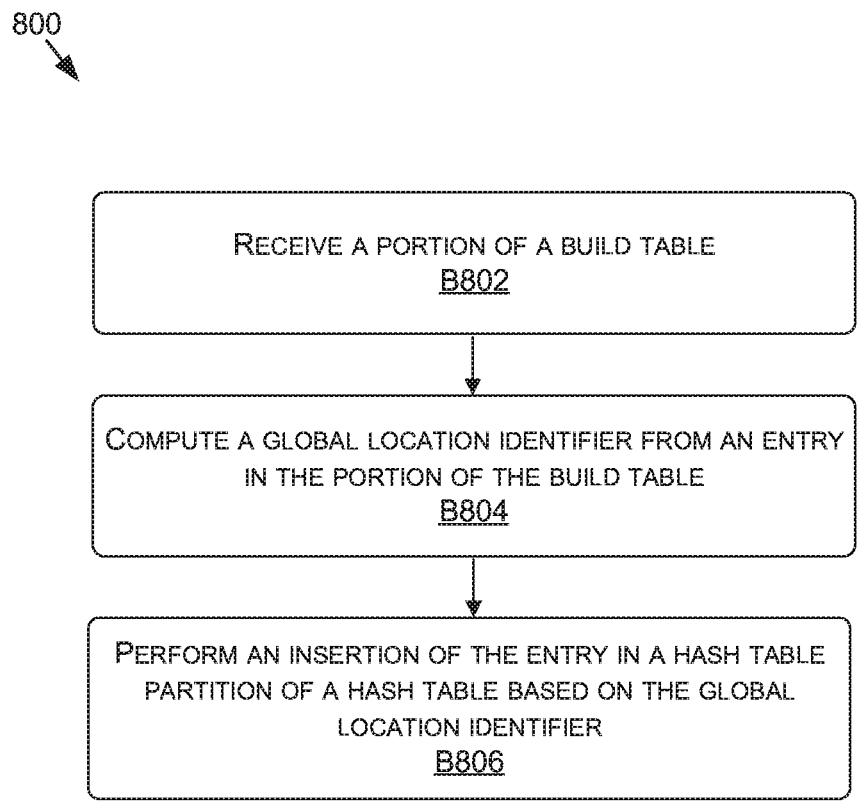
FIG. 8 is a flow diagram showing a method for distributed building of a hash table using multiple GPUs, in which a build table entry is associated with a local hash table partition, in accordance with some embodiments of the present disclosure.

Now referring to FIG. 8, each block of a method 800, and other methods described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, the methods are described, by way of example, with respect to the multi-GPU distributed processing system 100 (FIG. 1). However, these methods may additionally or alternatively be executed by any one system, or any combination of systems, including, but not limited to, those described herein.

FIG. 8 is a flow diagram showing a method 800 for distributed building of a hash table using multiple GPUs, in which a build table entry is associated with a local hash table partition, in accordance with some embodiments of the present disclosure. The method 800, at block B802, includes receiving a portion of a build table. For example, in the iteration 200A, the interface manager 110 of the GPU 102A may receive the build table portion 240A.

The method 800, at block B804, includes computing a global location identifier from an entry in the portion of the build table. For example, the location determiner 118 of the GPU 102A may compute, from an entry in the build table portion 240A, a global ID that identifies a designated GPU from the GPUs 102A-102N as being allocated the hash table partition 244A of the hash table 144 (and/or identifies the hash table partition 244A for an insertion of the entry). The computation may, for example, be made for the determination 210 performed by the hash table builder 112 of the GPU 102A.

The method 800, at block B806 includes performing an insertion of the entry in a hash table partition of a hash table based on the global location identifier. For example, the hash table builder 112 of the GPU 102A may perform the insertion of the entry in the hash table partition 244A based on the global ID identifying the GPU 102A as the designated GPU (and/or identifying the hash table partition 244A for the insertion of the entry). The insertion may, for example, be made in response to the determination 210 performed by the hash table builder 112 of the GPU 102A.

After building the hash table using the method 800, at least a portion of the hash table may be probed. For example, the hash table prober 114 of the GPU 102A may probe at least a portion of the hash table 144 using at least a portion of the probe table 142 to produce one or more of the results 146. In some examples, the hash table partitions 244A-244N may be merged to form replicated copies and the probing may be of a local copy of the hash table 144. In other examples, the probing may be of the hash table partition 244A. Further, the probing and result materialization may be performed using any suitable approach including those described herein. While the method 800 is primarily described for the iteration 200A, the method 800 may similarly apply to the iteration 200B. Further, the method 800 may apply to embodiments where the GPUs 102A-102N may perform remote insertions of entries from local build table portions into hash table partitions allocated to other GPUs, in which case data from the local build table portions may not be provided to the other GPUs for those GPUs to perform insertions and the iteration 200B may not be needed.

Figure 9:
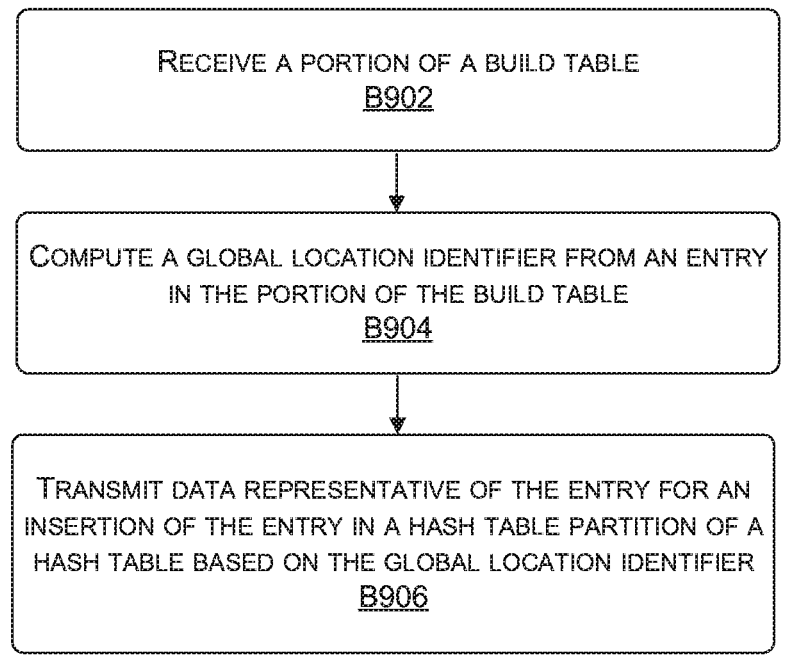
FIG. 9 is a flow diagram showing a method for distributed building of a hash table using multiple, in which a build table entry is associated with a remote hash table partition, in accordance with some embodiments of the present disclosure.

Now referring to FIG. 9, FIG. 9 is a flow diagram showing a method 900 for distributed building of a hash table using multiple GPUs, in which a build table entry is associated with a remote hash table partition, in accordance with some embodiments of the present disclosure. The method 900, at block B902, includes receiving a portion of a build table. For example, in the iteration 200A, the interface manager 110 of the GPU 102A may receive the build table portion 240A.

The method 900, at block B904, includes computing a global location identifier from an entry in the portion of the build table. For example, the location determiner 118 of the GPU 102A may compute, from an entry in the build table portion 240A, a global ID that identifies a designated GPU from the GPUs 102A-102N as being allocated the hash table partition 244N of the hash table 144 (and/or identifies the hash table partition 244N for an insertion of the entry). The computation may, for example, be made for the determination 210 performed by the hash table builder 112 of the GPU 102A.

The method 900, at block B906 includes transmitting data representative of the entry for an insertion of the entry in a hash table partition of a hash table based on the global location identifier. For example, the interface manager 110 of the GPU 102A may transmit data representative of the entry for the insertion of the entry in the hash table partition 244N at the designated GPU based on the global location identifier identifying the designated GPU as being different than the GPU 102A (and/or identifying the hash table partition 244N for the insertion of the entry). This transmitting may, for example, be made in response to the determination 210 performed by the hash table builder 112 of the GPU 102A and the entry may be included in the build table portion 242A provided to the GPU 102B. Later, the GPU 102B may provide the data to the GPU 102N, which may perform the insertion into the hash table partition 244N. In other examples, the data may be transmitted by the GPU 102A or the GPU 102B to the GPU 102N as part of a remote insertion into the hash table partition 244N. Further, the GPU that the GPU 102A provides the data to may depend on the exchange or routing algorithm employed.

After building the hash table using the method 900, at least a portion of the hash table may be probed. For example, the hash table prober 114 of the GPU 102A may probe at least a portion of the hash table 144 using at least a portion of the probe table 142 to produce one or more of the results 146. In some examples, the hash table partitions 244A-244N may be merged to form replicated copies and the probing may be of a local copy of the hash table 144. In other examples, the probing may be of the hash table partition 244A. Further, the probing and result materialization may be performed using any suitable approach including those described herein. While the method 900 is primarily described for the iteration 200A, the method 900 may similarly apply to the iteration 200B. Further, the method 900 may apply to embodiments where the GPUs 102A-102N may perform remote insertions of entries from local build table portions into hash table partitions allocated to other GPUs, in which case data from the local build table portions may not be provided to the other GPUs for those GPUs to perform insertions and the iteration 200B may not be needed.

Figure 10:
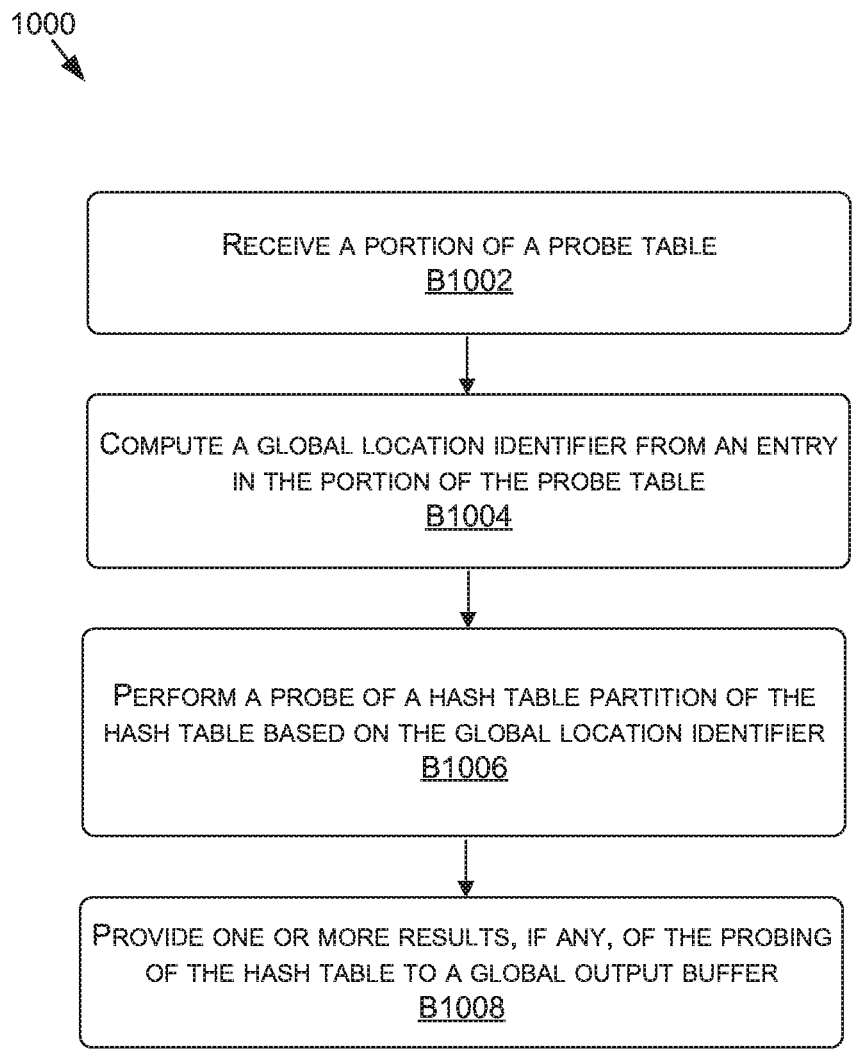
FIG. 10 is a flow diagram showing a method for distributed probing of a hash table using multiple GPUs, in which a probe table entry is associated with a local hash table partition, in accordance with some embodiments of the present disclosure.

Now referring to FIG. 10, FIG. 10 is a flow diagram showing a method 1000 for distributed probing of a hash table using multiple GPUs, in which a probe table entry is associated with a local hash table partition, in accordance with some embodiments of the present disclosure. The method 1000, at block B1002, includes receiving a portion of a probe table. For example, in the iteration 400A, the interface manager 110 of the GPU 102A may receive the probe table portion 442A.

The method 1000, at block B1004, includes computing a global location identifier from an entry in the portion of the probe table. For example, the location determiner 118 of the GPU 102A may compute, from an entry in the probe table portion 442A, a global ID that identifies a designated GPU from the GPUs 102A-102N as including the hash table partition 244A of the hash table 144 for probing of the entry (and/or identifies that the hash table partition 244A should be probed using the entry). The computation may, for example, be made for the determination 410 performed by the hash table prober 114 of the GPU 102A.

The method 1000, at block B1006 includes performing a probe of a hash table partition of a hash table based on the global location identifier. For example, the hash table prober 114 of the GPU 102A may perform the probing of the hash table partition 244A using the entry based on the global ID identifying the GPU 102A as the designated GPU (and/or identifying that the hash table partition 244A should be probed using the entry). The probing may, for example, be performed in response to the determination 410 performed by the hash table prober 114 of the GPU 102A.

The method 1000, at block B1008, includes providing one or more results, if any, of the probing of the hash table to a global output buffer. For example, the hash table prober 114 of the GPU 102A may use the results manager 116 to materialize one or more of the results 146 to a global output buffer, such as the global output buffer 608 of FIG. 6 and FIG. 7. The probing and result materialization may be performed using any suitable approach including those described herein. While the method 1000 is primarily described for the iteration 400A, the method 1000 may similarly apply to the iteration 400B. Further, the method 1000 may apply to embodiments where the GPUs 102A-102N may perform remote probes using entries from local probe table portions to hash table partitions on other GPUs, in which case data from the local probe table portions may not be provided to the other GPUs for those GPUs to perform probes and the iteration 400B may not be needed.

Further, the method 1000 may also apply to the approaches described with respect to FIG. 5. For example, the GPU 102A may use a global ID from block B1004 to determine whether to probe the hash table portion 544A in the iteration 500A at block B1006, and/or may use a global ID from block B1004 to determine whether to probe the hash table portion 546A in the iteration 500B at block B1006.

Figure 11:
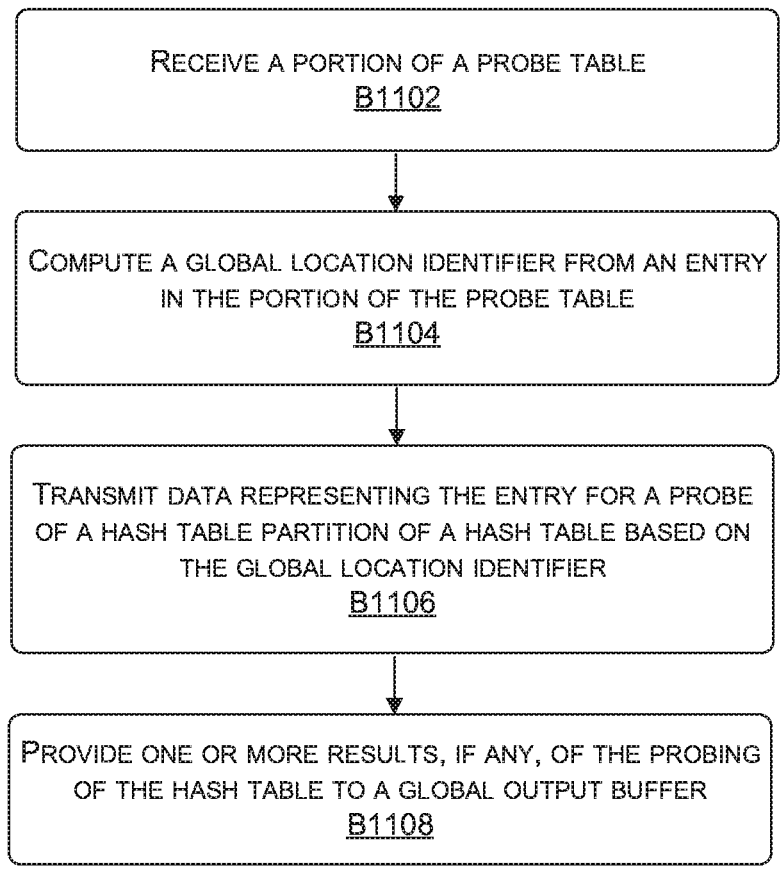
FIG. 11 is a flow diagram showing a method for distributed probing of a hash table using multiple GPUs, in which a probe table entry is associated with a remote hash table partition, in accordance with some embodiments of the present disclosure.

Now referring to FIG. 11, FIG. 11 is a flow diagram showing a method 1100 for distributed probing of a hash table using multiple GPUs, in which a probe table entry is associated with a remote hash table partition, in accordance with some embodiments of the present disclosure. The method 1100, at block B1102, includes receiving a portion of a probe table. For example, in the iteration 400A, the interface manager 110 of the GPU 102A may receive the probe table portion 442A.

The method 1100, at block B1104, includes computing a global location identifier from an entry in the portion of the probe table. For example, the location determiner 118 of the GPU 102A may compute, from an entry in the probe table portion 442A, a global ID that identifies a designated GPU from the GPUs 102A-102N as including the hash table partition 244N of the hash table 144 for probing of the entry (and/or identifies that the hash table partition 244N should be probed using the entry). The computation may, for example, be made for the determination 410 performed by the hash table prober 114 of the GPU 102A.

The method 1100, at block B1106 includes transmitting data representing the entry for a probe of a hash table partition of a hash table based on the global location identifier. For example, the interface manager 110 of the GPU 102A may transmit data representative of the entry for the probing of the hash table partition 244N using the entry at the designated GPU based on the global location identifier identifying the designated GPU as being different than the GPU 102A (and/or identifying that the hash table partition 244N should be probed using the entry). This transmitting may, for example, be made in response to the determination 410 performed by the hash table prober 114 of the GPU 102A and the entry may be included in the probe table portion 444A provided to the GPU 102B. Later, the GPU 102B may provide the data to the GPU 102N, which may perform the probe into the hash table partition 244N. In other examples, the data may be transmitted by the GPU 102A or the GPU 102B to the GPU 102N as part of a remote probe into the hash table partition 244N. Further, the GPU that the GPU 102A provides the data to may depend on the exchange or routing algorithm employed.

The method 1100, at block B1108, includes providing one or more results, if any, of the probing of the hash table to a global output buffer. For example, the hash table prober 114 of the GPU 102A may use the results manager 116 to materialize one or more of the results 146 to a global output buffer, such as the global output buffer 608 of FIG. 6 and FIG. 7. The probing and result materialization may be performed using any suitable approach including those described herein. While the method 1100 is primarily described for the iteration 400A, the method 1000 may similarly apply to the iteration 400B. Further, the method 1000 may apply to embodiments where the GPUs 102A-102N may perform remote probes using entries from local probe table portions to hash table partitions on other GPUs, in which case data from the local probe table portions may not be provided to the other GPUs for those GPUs to perform probes and the iteration 400B may not be needed.

Further, the method 1100 may also apply to the approaches described with respect to FIG. 5. For example, the GPU 102A may use a global ID from block B1104 to determine whether to probe the hash table portion 544A in the iteration 500A at block B1106, and/or may use a global ID from block B1104 to determine whether to probe the hash table portion 546A in the iteration 500B at block B1106.

Figure 12:
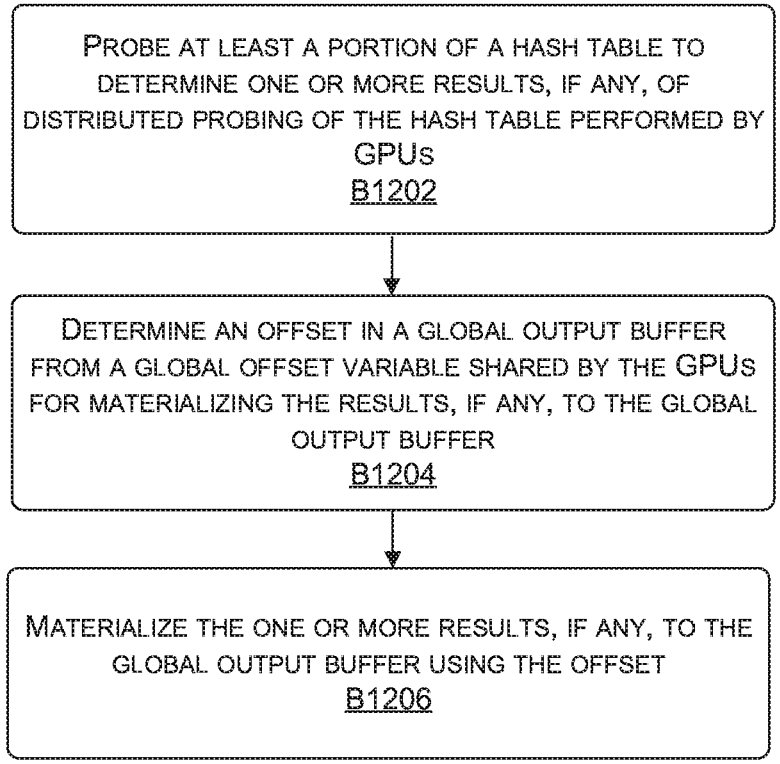
FIG. 12 is a flow diagram showing a method for materializing results of distributed probing of a hash table using multiple GPUs and a global offset variable, in accordance with some embodiments of the present disclosure.

Now referring to FIG. 12, FIG. 12 is a flow diagram showing a method 1200 for materializing results of distributed probing of a hash table using multiple GPUs and a global offset variable, in accordance with some embodiments of the present disclosure. The method 1200, at block B1202, includes probing at least a portion of a hash table to determine one or more results, if any, of distributed probing of the hash table performed by GPUs. For example, hash table prober 114 of the GPUs 102A-102N of FIG. 6 may perform distributed probing of the hash table 144 using any suitable approach described herein, or other suitable approaches. The GPU 102A, for example, may determine the results 610A, which may be a portion of the results 146 of the probing.

The method 1200, at block B1204, includes determining an offset in a global output buffer based on a global offset variable from a global offset variable shared by the GPUs for materializing the results, if any, to the global output buffer. For example, the results manager 116 of the GPU 102A may determine an offset in the global output buffer 608 from the global offset variable 604.

The method 1200, at block B1206 includes materializing the one or more results, if any, to the global output buffer using the offset. For example, the results manager 116 of the GPU 102A may materialize the results 610A to the global output buffer 608 at a location in the global output buffer 608 that corresponds to the offset.

Figure 13:
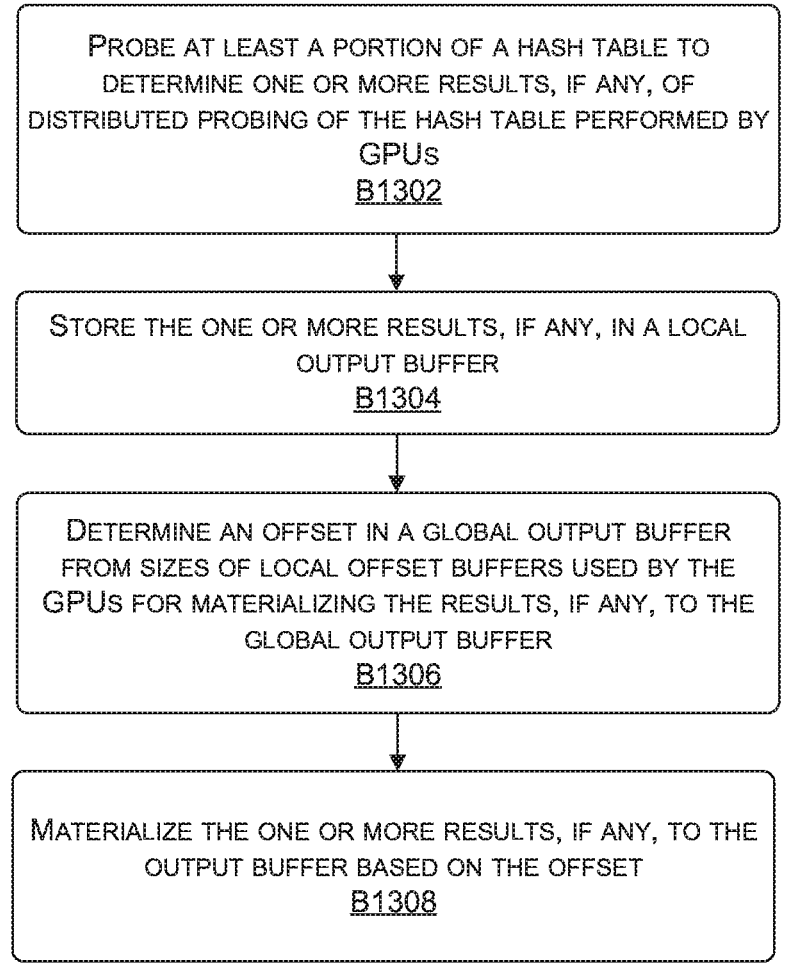
FIG. 13 is a flow diagram showing a method for materializing results of distributed probing of a hash table using multiple GPUs and sizes of local offset buffers, in accordance with some embodiments of the present disclosure.

Now referring to FIG. 13, FIG. 13 is a flow diagram showing a method 1300 for materializing results of distributed probing of a hash table using multiple GPUs and sizes of local offset buffers, in accordance with some embodiments of the present disclosure. The method 1300, at block B1302, includes probing at least a portion of a hash table to determine one or more results, if any, of distributed probing of the hash table performed by GPUs. For example, hash table prober 114 of the GPUs 102A-102N of FIG. 7 may perform distributed probing of the hash table 144 using any suitable approach described herein, or other suitable approaches. The GPU 102A, for example, may determine the results 610A, which may be a portion of the results 146 of the probing.

The method 1300, at block B1304, includes storing the one or more results, if any, in a local output buffer. For examples, the results manager 116 of the GPU 102A may store the results 610A to a local output buffer of the GPU 102A.

The method 1300, at block B1306 includes determining an offset in a global output buffer from sizes of local offset buffers used by the GPUs for materializing the results, if any, to the global output buffer. For example, the results manager 116 may use sizes of local output buffers of the GPUs 102A-102N to compute an exclusive prefix sum of the local output buffers, which may include the offset for the results 610A in the global output buffer 608.

The method 1300, at block B1306 includes materializing the one or more results, if any, to the global output buffer using the offset. For example, the results manager 116 of the GPU 102A may materialize the results 610A to the global output buffer 608 at a location in the global output buffer 608 that corresponds to the offset.

Figure 14:
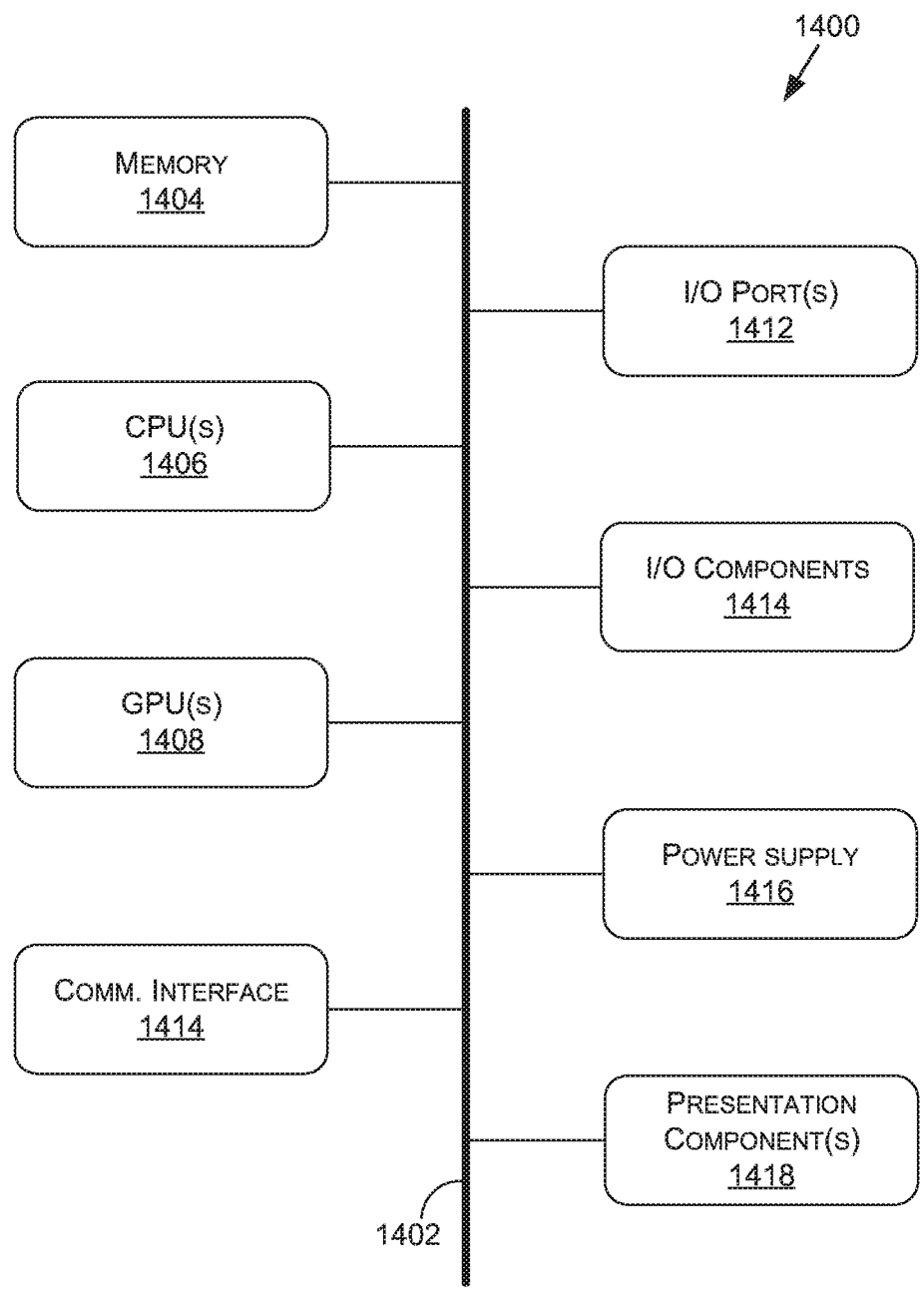
FIG. 14 is a block diagram of an example computing device suitable for use in implementing some embodiments of the present disclosure.

FIG. 14 is a block diagram of an example computing device 1400 suitable for use in implementing some embodiments of the present disclosure. Computing device 1400 may include an interconnect system 1402 that directly or indirectly couples the following devices: memory 1404, one or more central processing units (CPUs) 1406, one or more graphics processing units (GPUs) 1408, a communication interface 1410, input/output (I/O) ports 1412, input/output components 1414, a power supply 1416, and one or more presentation components 1418 (e.g., display(s)). One or more of the GPUs 102A-102N may correspond to the one or more GPUs 1408 and/or be included in one or more instantiations of the computing device 1400. Further, one or more of the CPUs 104 may correspond to one or more of the one or more CPUs 1406 and/or be included in one or more instantiations of the computing device 1400. Further, various memory described herein may correspond to the memory 1404 and/or one or more instantiations of the computing device 1400.

Although the various blocks of FIG. 14 are shown as connected via the interconnect system 1402 with lines, this is not intended to be limiting and is for clarity only. For example, in some embodiments, a presentation component 1418, such as a display device, may be considered an I/O component 1414 (e.g., if the display is a touch screen). As another example, the CPUs 1406 and/or GPUs 1408 may include memory (e.g., the memory 1404 may be representative of a storage device in addition to the memory of the GPUs 1408, the CPUs 1406, and/or other components). In other words, the computing device of FIG. 14 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 14.

The interconnect system 1402 may represent one or more links or busses, such as an address bus, a data bus, a control bus, or a combination thereof. The interconnect system 1402 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1406 may be directly connected to the memory 1404. Further, the CPU 1406 may be directly connected to the GPU 1408. Where there is direct, or point-to-point connection between components, the interconnect system 1402 may include a PCIe link to carry out the connection. In these examples, a PCI bus need not be included in the computing device 1400.

The memory 1404 may include any of a variety of computer-readable media. The computer-readable media may be any available media that may be accessed by the computing device 1400. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1404 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1400. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1406 may be configured to execute the computer-readable instructions to control one or more components of the computing device 1400 to perform one or more of the methods and/or processes described herein. The CPU(s) 1406 may each include one or more cores (e.g., one, two, four, eight, twenty-eight, seventy-two, etc.) that are capable of handling a multitude of software threads simultaneously. The CPU(s) 1406 may include any type of processor, and may include different types of processors depending on the type of computing device 1400 implemented (e.g., processors with fewer cores for mobile devices and processors with more cores for servers). For example, depending on the type of computing device 1400, the processor may be an Advanced RISC Machines (ARM) processor implemented using Reduced Instruction Set Computing (RISC) or an x86 processor implemented using Complex Instruction Set Computing (CISC). The computing device 1400 may include one or more CPUs 1406 in addition to one or more microprocessors or supplementary co-processors, such as math co-processors.

The GPU(s) 1408 may be used by the computing device 1400 to render graphics (e.g., 3D graphics) or performed general purpose computations. For example, the GPU(s) 1408 may be used for General-Purpose computing on GPUs (GPGPU). The GPU(s) 1408 may include hundreds or thousands of cores that are capable of handling hundreds or thousands of software threads simultaneously. The GPU(s) 1408 may generate pixel data for output images in response to rendering commands (e.g., rendering commands from the CPU(s) 1406 received via a host interface). The GPU(s) 1408 may include graphics memory, such as display memory, for storing pixel data or any other suitable data, such as GPGPU data. The display memory may be included as part of the memory 1404. The GPU(s) 1408 may include two or more GPUs operating in parallel (e.g., via a link). The link may directly connect the GPUs (e.g., using NVLINK) or may connect the GPUs through a switch (e.g., using NVSwitch). When combined together, each GPU 1408 may generate pixel data or GPGPU data for different portions of an output or for different outputs (e.g., a first GPU for a first image and a second GPU for a second image). Each GPU may include its own memory, or may share memory with other GPUs.

The communication interface 1410 may include one or more receivers, transmitters, and/or transceivers that enable the computing device 1400 to communicate with other computing devices via an electronic communication network, included wired and/or wireless communications. The communication interface 1410 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 1412 may enable the computing device 1400 to be logically coupled to other devices including the I/O components 1414, the presentation component(s) 1418, and/or other components, some of which may be built in to (e.g., integrated in) the computing device 1400. Illustrative I/O components 1414 include a microphone, mouse, keyboard, joystick, game pad, game controller, satellite dish, scanner, printer, wireless device, etc. The I/O components 1414 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1400. The computing device 1400 may be include depth cameras, such as stereoscopic camera systems, infrared camera systems, RGB camera systems, touchscreen technology, and combinations of these, for gesture detection and recognition. Additionally, the computing device 1400 may include accelerometers or gyroscopes (e.g., as part of an inertia measurement unit (IMU)) that enable detection of motion. In some examples, the output of the accelerometers or gyroscopes may be used by the computing device 1400 to render immersive augmented reality or virtual reality.

The power supply 1416 may include a hard-wired power supply, a battery power supply, or a combination thereof. The power supply 1416 may provide power to the computing device 1400 to enable the components of the computing device 1400 to operate.

The presentation component(s) 1418 may include a display (e.g., a monitor, a touch screen, a television screen, a heads-up-display (HUD), other display types, or a combination thereof), speakers, and/or other presentation components. The presentation component(s) 1418 may receive data from other components (e.g., the GPU(s) 1408, the CPU(s) 1406, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The invention claimed is:

1. A method comprising:
receiving, by a graphics processing unit (GPU) from a plurality of GPUs, a portion of a build table;
reading an entry of the portion of the build table, wherein the plurality of GPUs are assigned respective partitions of a hash table that represent respective parts of the hash table, and the GPU is assigned at least one hash table partition of the partitions of hash table;
computing, from the entry in the portion of the build table, a global location identifier that corresponds to one or more locations in the hash table;
determining, using the global location identifier, the entry corresponds to the at least one hash table partition assigned to the GPU;
performing, by the GPU, an insertion of the entry in the hash table partition based at least on the entry being determined to correspond to the at least one hash table partition assigned to the GPU; and
probing, by the GPU, at least a portion of the hash table using at least a portion of a probe table to produce one or more results.

2. The method of claim 1, wherein the one or more results comprise an output of a join operation performed as part of executing a query against a relational database.

3. The method of claim 1, wherein the performing of the insertion is based on determining that a hash value of one or more keys of the entry falls within the at least one hash table partition assigned to the GPU.

4. The method of claim 1, wherein the global location identifier is a global hash index that identifies a location for the entry in the hash table.

5. The method of claim 1, further comprising:
filtering, by the GPU, entries from the portion of the build table based on the global location identifier and generating a filtered portion of the build table that does not include entries for the GPU; and
transmitting the filtered portion of the build table to a different GPU of the plurality of GPUs, the transmitting causing one or more insertions of one or more entries in the filtered portion of the build table in the hash table.

6. The method of claim 1, further comprising:
after the insertion of the entry in the at least one hash table partition, merging two or more hash table partitions of the hash table across the plurality of GPUs to form a fully replicated copy of the hash table on each of the plurality of GPUs, wherein the at least a portion of the hash table used in the probing is the fully replicated copy of the hash table on the GPU.

7. The method of claim 1, wherein the at least a portion of the hash table used in the probing is the at least one hash table partition assigned to the GPU.

8. The method of claim 1, wherein the portion of the build table is received from a different GPU of the plurality of GPUs based at least on the entry being determined to correspond to the at least one hash table partition assigned to the GPU.

9. The method of claim 1, wherein:
the receiving the portion of the build table is in a first buffer of the GPU used to analyze the entry in an iteration of the GPU iteratively analyzing entries of the build table for insertions into the hash table, and the method further comprises:

receiving, from a different GPU of the plurality of GPUs, a different portion of the build table at a second buffer of the GPU that is used as a staging buffer in the iteration for a subsequent iteration of the GPU iteratively analyzing entries of the build table for insertions into the hash table.

10. A method comprising:

receiving, by a first graphics processing unit (GPU), a portion of a build table, the first GPU being from a plurality of GPUs;

reading first data from an entry of the portion of the build table, wherein the plurality of GPUs are assigned respective partitions of a hash table that represent respective parts of the hash table, and a second GPU from the plurality of GPUs is assigned at least one hash table partitions of the hash table;

computing, from the first data read from the entry in the portion of the build table, a global location identifier that corresponds to one or more locations in the hash table;

determining, using the global location identifier, the entry corresponds to the hash table partition assigned to the second GPU;

transmitting, by the first GPU, second data representative of at least the entry for an insertion of the entry in the hash table partition at the second GPU based at least on the entry being determined to correspond to the hash table partition assigned to the second GPU; and probing, by the first GPU, at least a portion of the hash table using at least a portion of a probe table to produce one or more results.

11. The method of claim 10, wherein the transmitting the second data includes remotely directing, by the first GPU, the insertion of the entry in the hash table partition at the second GPU.

12. The method of claim 10, wherein the transmitting the second data includes transmitting the second data to a buffer of the second GPU or a third GPU of the plurality of GPUs that is a different GPU from either the first GPU or the second GPU.

13. The method of claim 10, wherein the second data is representative of a plurality of entries of the portion of the build table and the plurality of entries includes the entry.

14. The method of claim 10, wherein the transmitting of the second data is to a third GPU of the plurality of GPUs that is a different GPU from either the first GPU or the second GPU, the third GPU being determined by a ring exchange or a hierarchical exchange between the plurality of GPUs.

15. A system comprising:

a plurality of graphics processing units (GPUs) to perform collaborative building of a hash table from a build table, wherein the plurality of GPUs are assigned respective hash table partitions that represent respective parts of the hash table, and wherein each GPU of the plurality of GPUs:

reads data from an entry of a portion of the build table, determines, from the data read from the entry of the portion of the build table, a global location identifier that corresponds to one or more locations in the hash table, and determines, using the global location identifier, the entry corresponds to a hash table partition assigned to a designated GPU from the plurality of GPUs, the hash table partition being of the respective hash table partitions;

wherein the entry is inserted into the hash table partition of the hash table at the designated GPU based at least on the entry being determined to correspond to the hash table partition assigned to the designated GPU.

16. The system of claim 15, wherein a first GPU of the plurality of GPUs provides data representative of at least the entry to a different one of the plurality of GPUs when the first GPU determines, based on the global location identifier, the designated GPU is different than the first GPU.

17. The system of claim 15, wherein a first GPU of the plurality of GPUs performs the insertion of the entry at the first GPU when the first GPU determines the first GPU is the designated GPU based on the global location identifier.

18. The system of claim 15, wherein the plurality of GPUs are logically arranged in a ring, and the building further includes each GPU of the plurality of GPUs providing data representative of a plurality of entries of the respective portion of the build table to a neighbor GPU in the ring.

19. The system of claim 15, wherein at least one GPU of the plurality of GPUs remotely performs the insertion of the entry in the hash table partition at the designated GPU.

20. The system of claim 15, wherein each GPU of the plurality of GPUs provides data representative of a plurality of entries of the respective portion of the build table to another GPU that is determined by a hierarchical exchange between the plurality of GPUs.

21. The system of claim 15, wherein the global location identifier comprises a GPU identifier computed using a key of the entry.

22. The system of claim 15, wherein the global location identifier corresponds to output of one or more equations that defines a first hash table partition of the hash table as being allocated to a first GPU of the plurality of GPUs for first one or more insertions of first one or more entries of the build table, and defines a second hash table partition of the hash table as being allocated to a second GPU of the plurality of GPUs for second one or more insertions of second one or more entries of the build table.

* * * * *